United States Patent
Yoon et al.

(10) Patent No.: US 8,600,328 B2
(45) Date of Patent: *Dec. 3, 2013

(54) RF TRANSCEIVER FRONT-END

(71) Applicant: Broadcom Corporation, Irvine, CA (US)

(72) Inventors: Seunghwan Yoon, Costa Mesa, CA (US); Franco De Flaviis, Irvine, CA (US); Ahmadreza Rofougaran, Newport Coast, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/663,444

(22) Filed: Oct. 29, 2012

(65) Prior Publication Data

US 2013/0052970 A1 Feb. 28, 2013

Related U.S. Application Data

(63) Continuation of application No. 12/620,053, filed on Nov. 17, 2009, now Pat. No. 8,306,497, which is a continuation of application No. 11/443,777, filed on May 30, 2006, now Pat. No. 7,657,243, which is a continuation-in-part of application No. 11/386,247, filed on Mar. 21, 2006, now Pat. No. 7,557,772.

(51) Int. Cl.
*H04B 7/00* (2006.01)
*H04B 1/06* (2006.01)

(52) U.S. Cl.
USPC ............................ 455/273; 455/129; 343/824

(58) Field of Classification Search
USPC ................... 455/129, 272–275, 276.1, 127.3; 343/824, 844, 893
See application file for complete search history.

(56) References Cited

U.S. PATENT DOCUMENTS 8,306,497 B2 * 11/2012 Yoon et al. ..................... 455/273

* cited by examiner

*Primary Examiner* — Christian Hannon
(74) *Attorney, Agent, or Firm* — Garlick & Markison; Bruce E. Stuckman

(57) ABSTRACT

An RF transceiver front-end includes receiver and transmitter front-ends. The receiver front-end includes $1^{st}$ and $2^{nd}$ antennas, a ninety degree phase shift module and an LNA module. The $1^{st}$ and $2^{nd}$ antennas receive inbound RF signals and provide a first directional circular polarization. The ninety degree phase shift module phase shifts the RF signals received by the $2^{nd}$ antenna. The LNA module amplifies the RF signals received by the $1^{st}$ antenna and the shifted RF signals. The transmitter front-end includes a PA module and $3^{rd}$ and $4^{th}$ antennas, which provide a second directional circular polarization. The PA module amplifies outbound RF signals to produce amplified outbound RF signals and amplified orthogonal outbound RF signals. The $3^{rd}$ antenna transmits the amplified outbound RF signals and the $4^{th}$ antenna transmits the amplified orthogonal outbound RF signals.

20 Claims, 17 Drawing Sheets

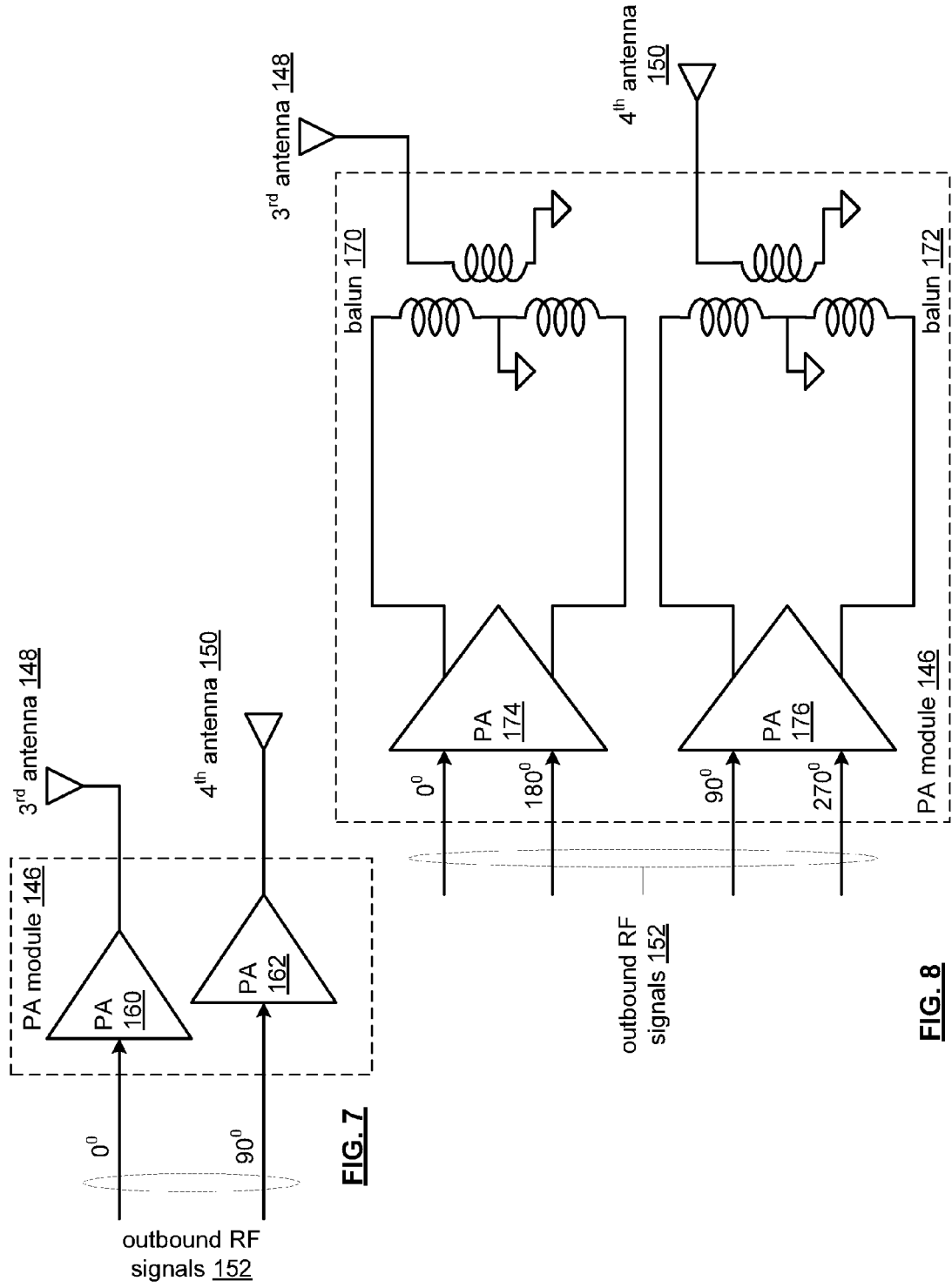

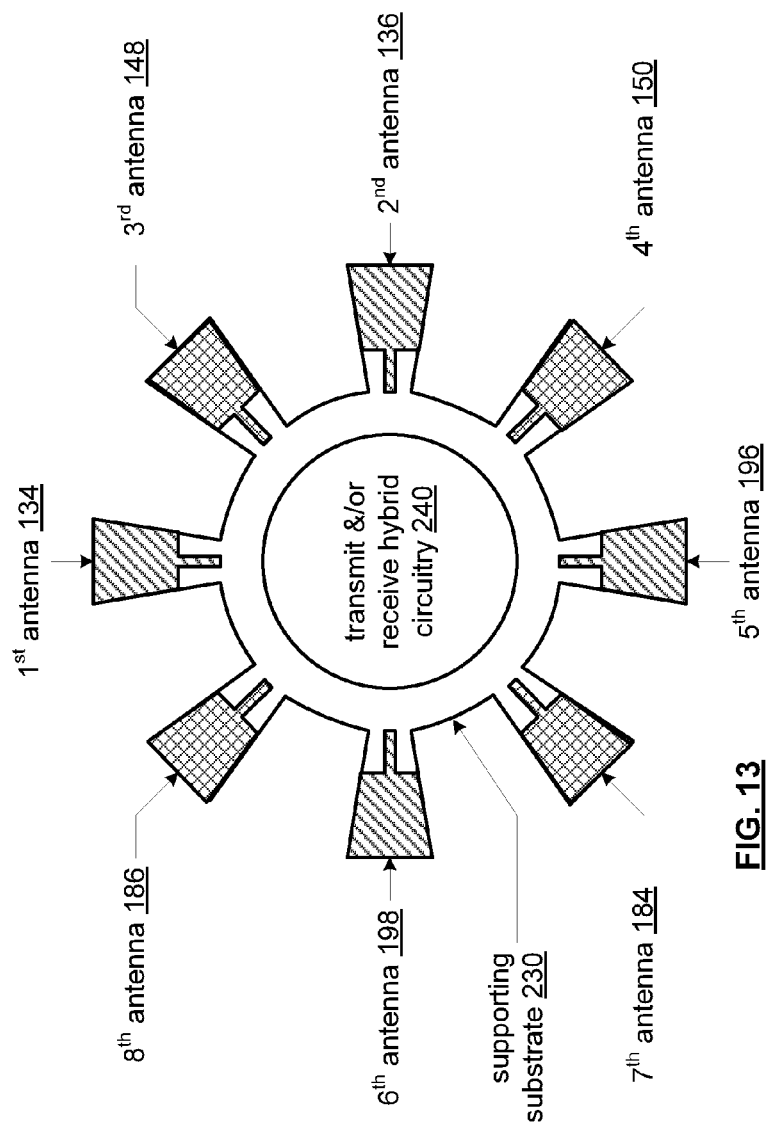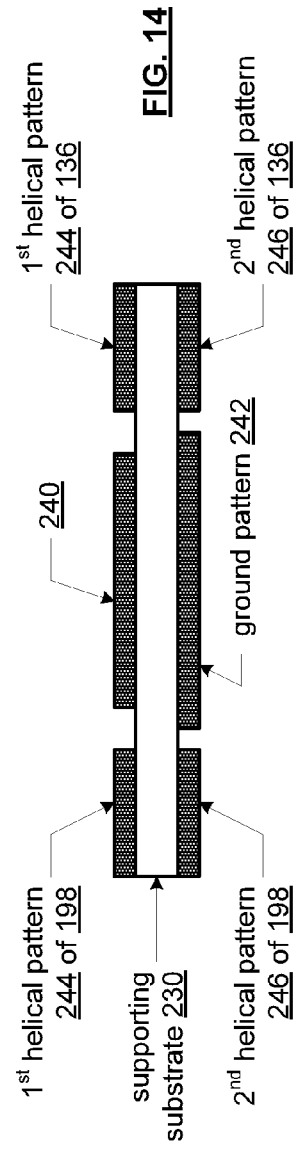
FIG. 13
FIG. 14

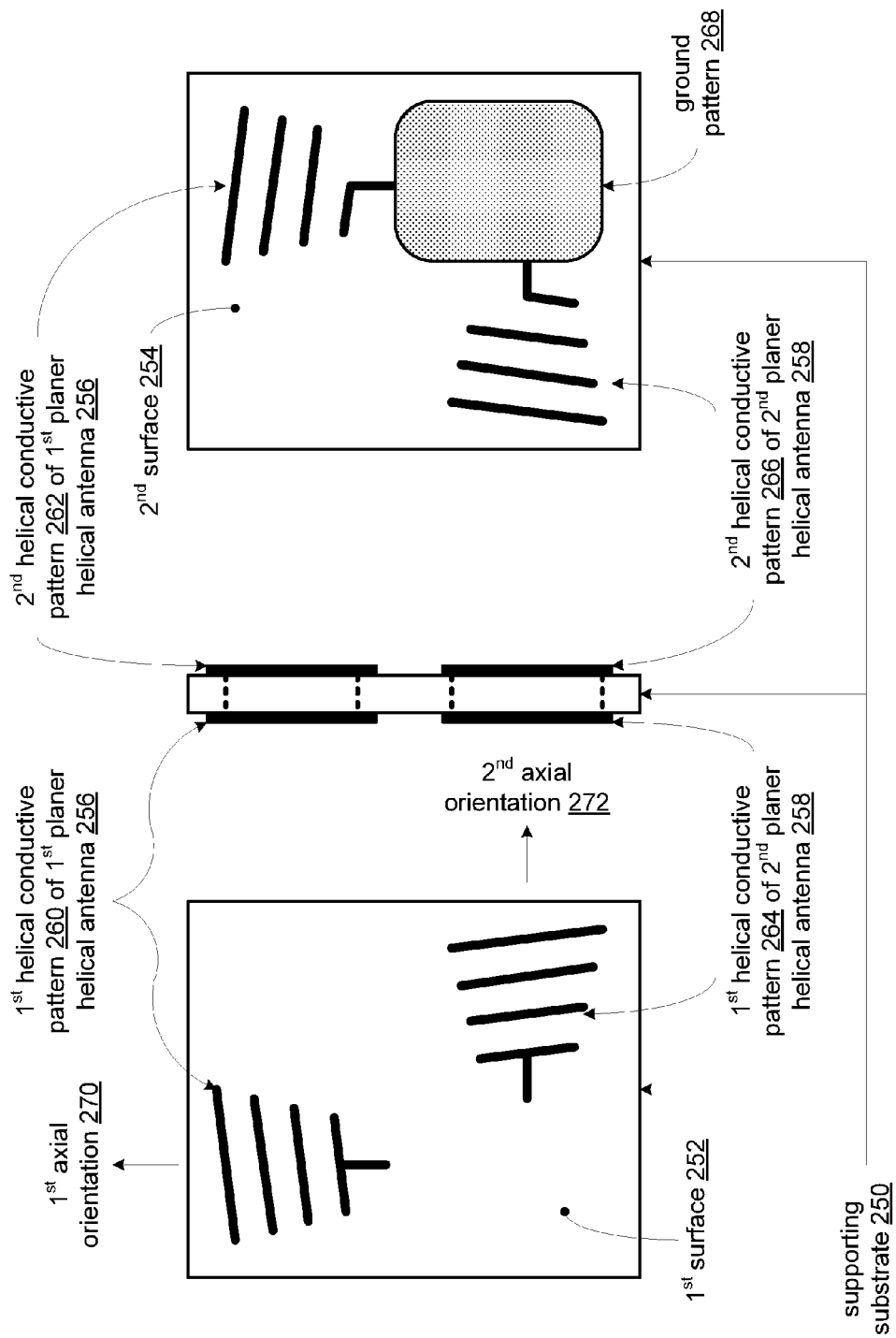

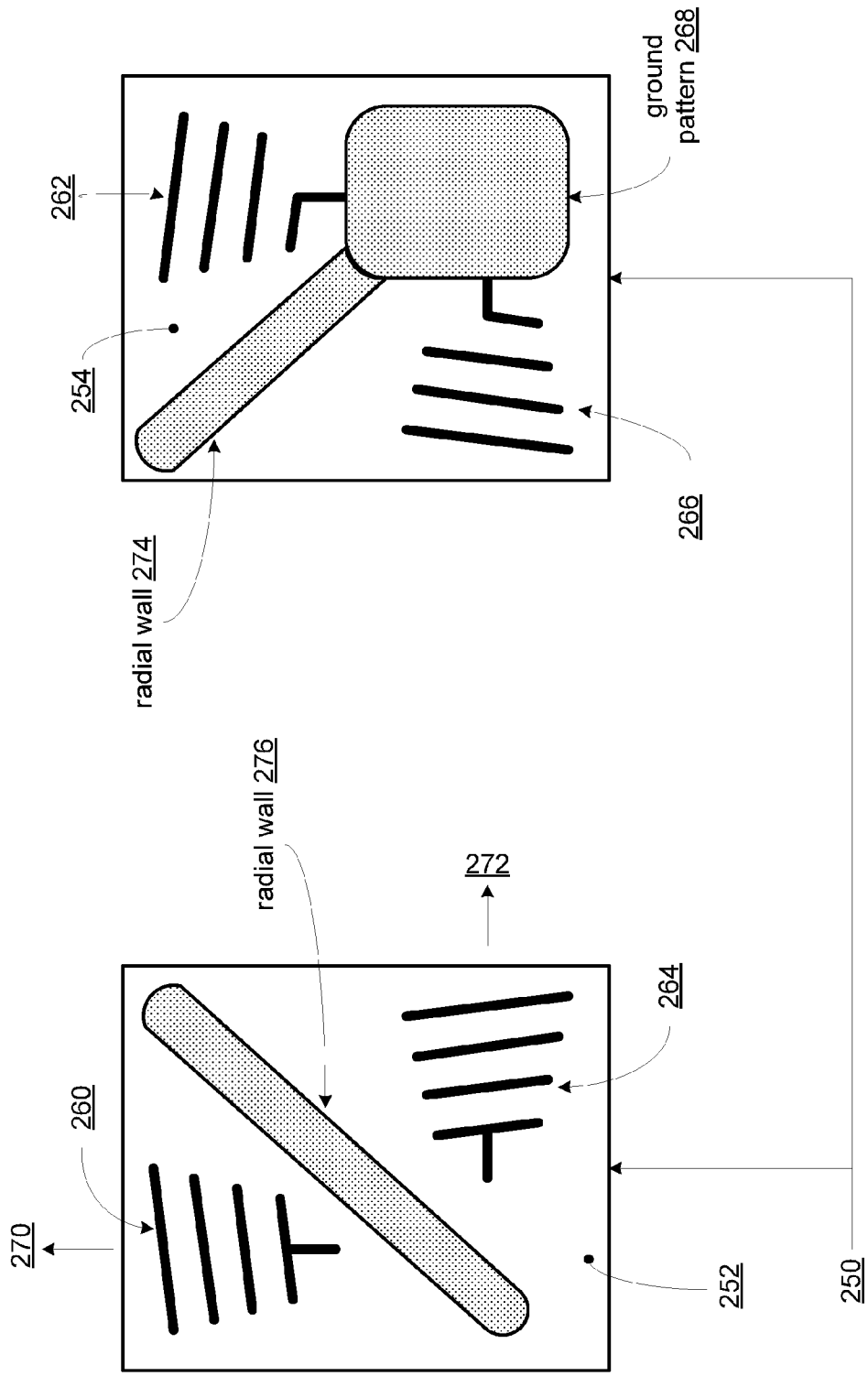

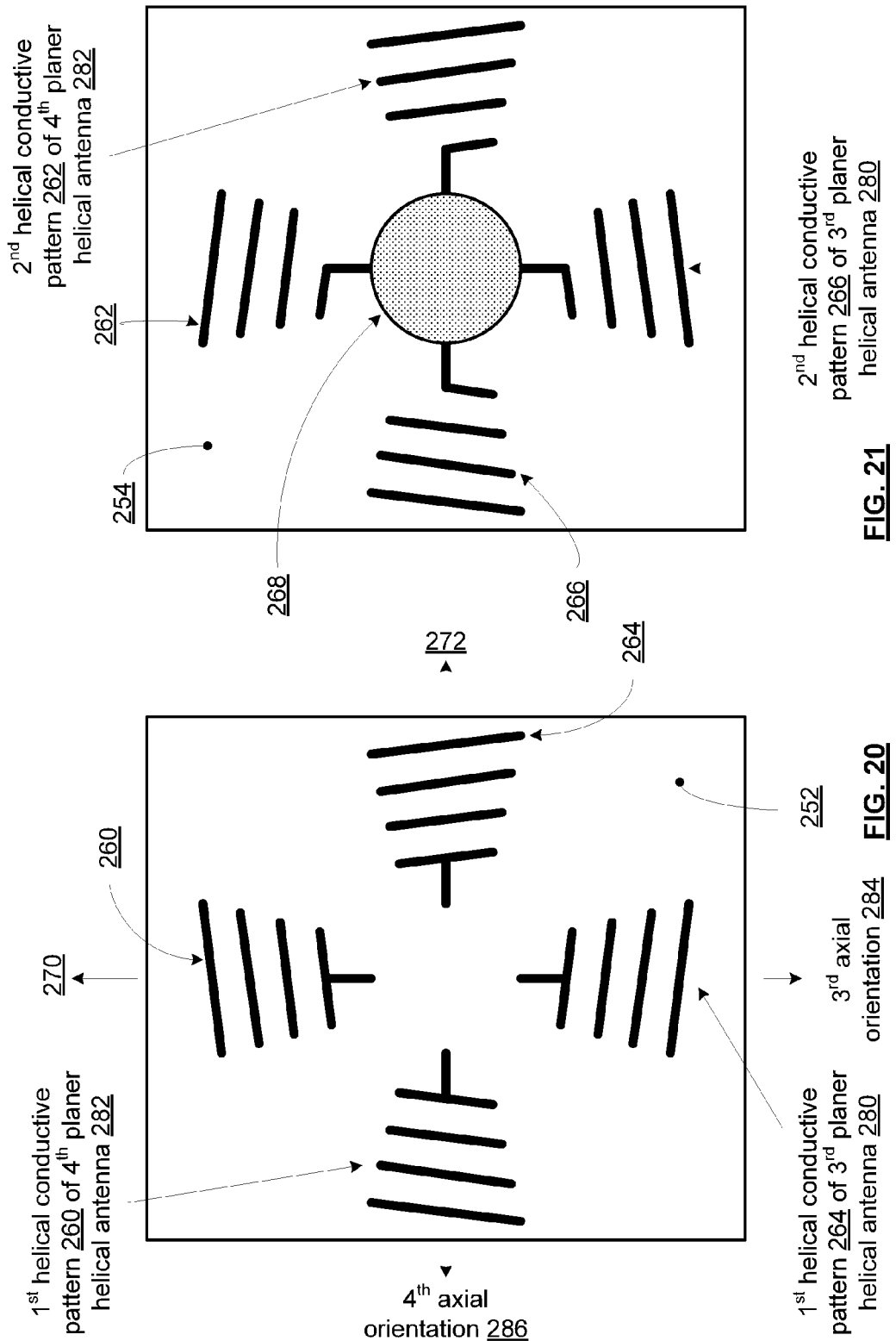

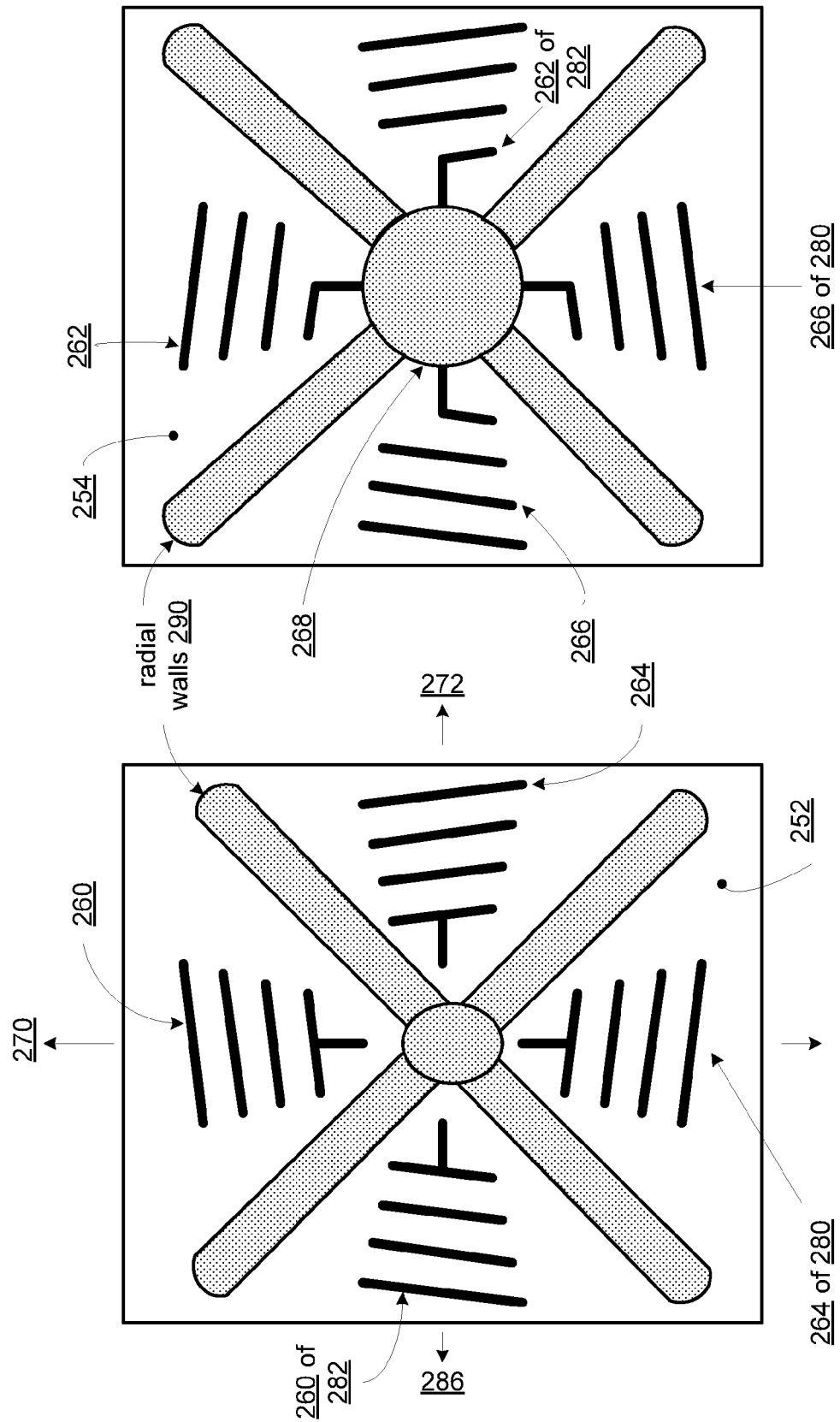

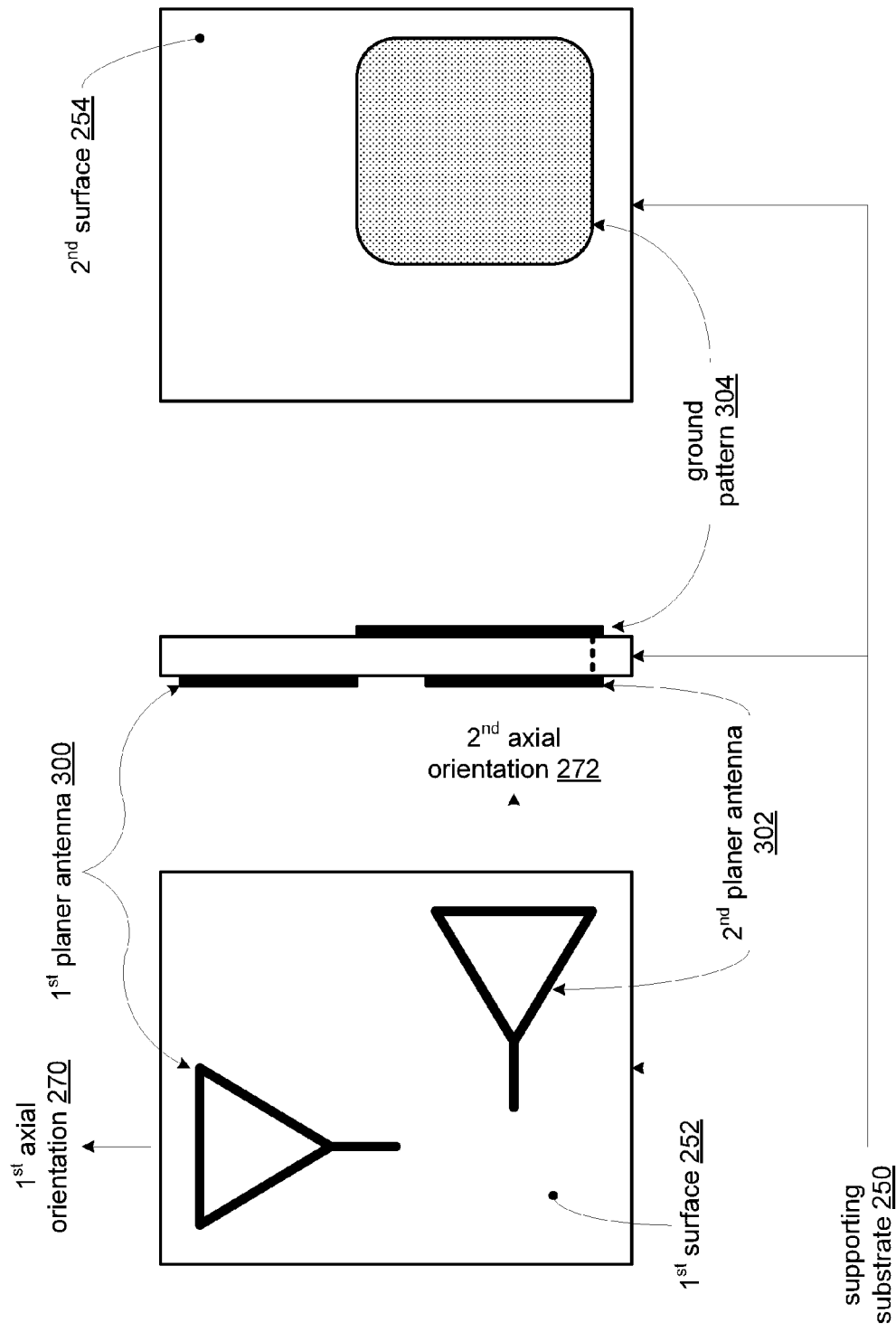

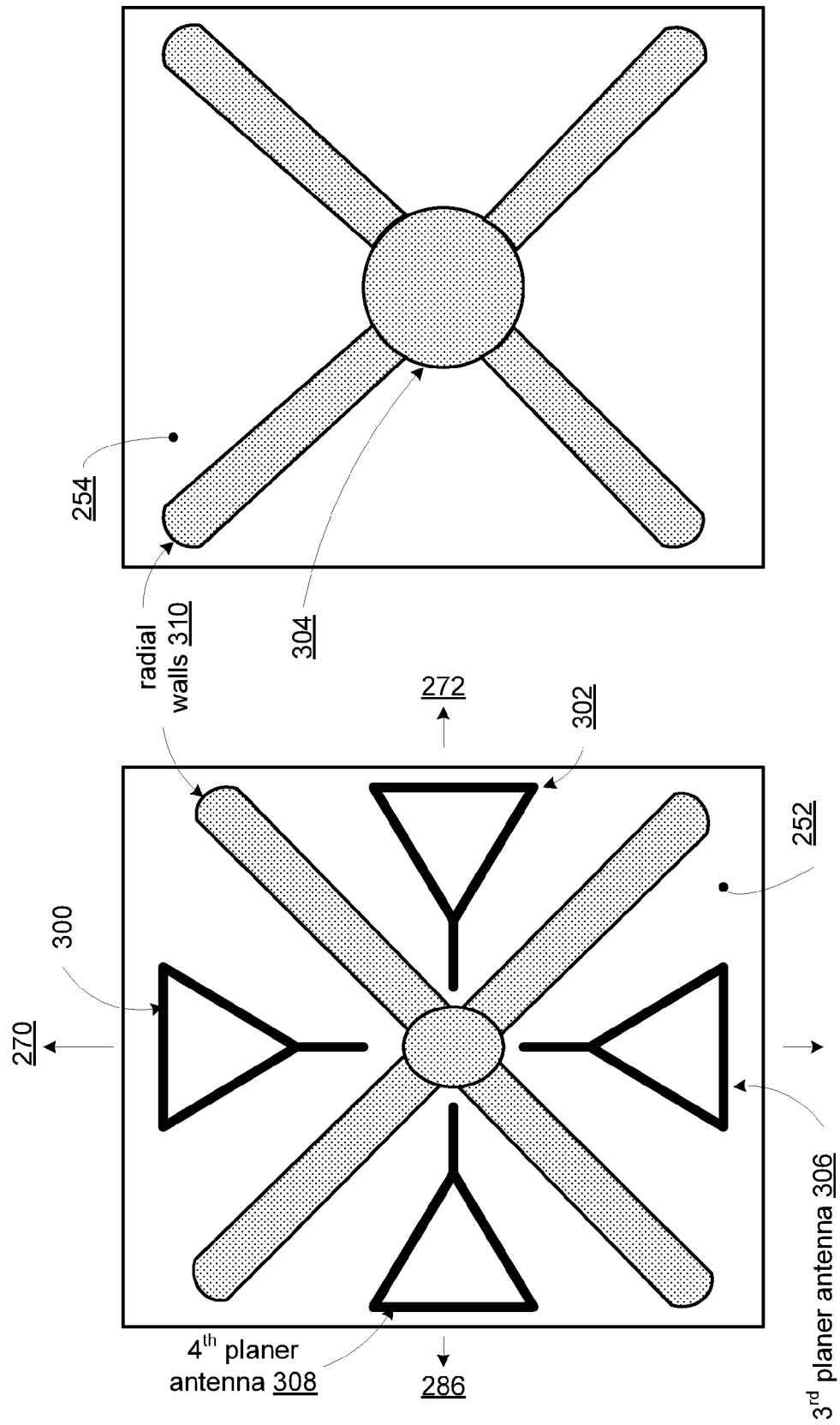

RF TRANSCEIVER FRONT-END

CROSS REFERENCE TO RELATED PATENTS

The present U.S. Utility patent application claims priority pursuant to 35 U.S.C. §120, as a continuation, to the following U.S. Utility patent application which is hereby incorporated herein by reference in its entirety and made part of the present U.S. Utility patent application for all purposes:
1. U.S. Utility application Ser. No. 12/620,053, entitled RF TRANSCEIVER FRONT-END, filed Nov. 17, 2009, issued as U.S. Pat. No. 8,306,497 on Nov. 6, 2012, which claims priority pursuant to USC §120 as a continuation, to the following U.S. Utility patent application:
2. U.S. Utility application Ser. No. 11/443,777, entitled RF TRANSCEIVER FRONT-END, filed May 30, 2006, issued as U.S. Pat. No. 7,657,243 on Feb. 2, 2010, which claims priority pursuant to USC §120 as a continuation-in-part, to the following U.S. Utility patent application:
3. U.S. Utility application Ser. No. 11/386,247, entitled PLANER HELICAL ANTENNA, filed Mar. 21, 2006, issued as U.S. Pat. No. 7,557,772 on Jul. 7, 2009.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Technical Field of the Invention

This invention relates generally to wireless communication systems and more particularly with transmitting and receiving radio frequency (RF) signals.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), radio frequency identification (RFID), and/or variations thereof.

Depending on the type of wireless communication system, a wireless communication device, such as a cellular telephone, two-way radio, personal digital assistant (PDA), personal computer (PC), laptop computer, home entertainment equipment, RFID reader, RFID tag, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system or a particular RF frequency for some systems) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to the antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

Due to the substantially varying distances and/or orientation between a transmitter and receiver, the signal strength of the signals received by the receiver vary greatly (e.g., from 10 dBm to −90 dBm). In addition, RF signals typically experience multiple path fading (i.e., transmission of an RF signal to a receiver occurs over multiple paths that are of different lengths causing the signal strength to vary with minor changes in position). There are numerous solutions to these issues including transmit power adjustments, diversity antenna structures, multiple input multiple output (MIMO) transmission schemes, and beamforming.

As is known, a transmitter may adjust its transmit power levels according to the signal strength of the signals received by the receiver. If the signal strength is strong (e.g., above −10 dBm), the transmitter may reduce its transmit power level, thereby conserving energy and keeping the received signal within a certain signal strength level (e.g., −10 dBm to −50 dBm). If, on the other hand, the signal strength is weak (e.g., below −50 dBm), the transmitter may increase its transmit power level. Despite the adjustable transmit power levels, when the transmitter is transmitting at its maximum power level and the signal strength is weak, the receiver must still accurately recapture the information contained in the received RF signals.

As is also known, diversity antenna structures include two or more antennas that are space at one-quarter wavelength intervals. Each antenna receives the same RF signals and the received signal strength of each antenna is measured. The antenna having the strongest, or most consistently strong, signal strength is selected as the RF input for the receiver. This can be a dynamic process that changes as the receiver is moved.

MIMO transmission schemes includes two or more transmission and hence reception paths between a transmitter and receiver to communicate a single stream of information. Within the transmitter, the single stream of information is split into two or more baseband paths. Each baseband path is separately processed in accordance with a MIMO transmission matrix to produce a transmit RF signal. The transmission matrix provides a phase, frequency, and/or time relationship between the transmit RF signals such that, at the receiver, each baseband path can be accurately reproduced. The antennas of a MIMO transmission have the same linear polarization (i.e., omni-directional transmission).

To further improve MIMO wireless communications, the number of transmit antennas may exceed the number of receiver antennas such that the transceiver may incorporate beamforming. In general, beamforming is a processing technique to create a focused antenna beam by shifting a signal in time or in phase to provide gain of the signal in a desired direction and to attenuate the signal in other directions. In order for a transmitter to properly implement beamforming (i.e., determine a beamforming matrix), it needs to know properties of the channel over which the wireless communication is conveyed. Accordingly, the receiver must provide feedback information for the transmitter to determine the properties of the channel.

In satellite communication systems, multiple antennas are used to transmit and receive signals with a satellite. Since the transmission path between a satellite transceiver and a terrestrial transceiver is relatively fixed in distance and direction when compared to terrestrial wireless communications, satellite systems may use a different transmission scheme that terrestrial wireless communication systems. For instance, a satellite system may use circular polarization of opposite directions for transmitting and receiving signals. Due to the differences between satellite systems and terrestrial wireless systems, different transmission schemes are used.

Therefore, a need exists for a terrestrial wireless transmission scheme and/or antenna structure that provides improved directional wireless communications.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWING(S)

FIG. 7 is a schematic block diagram of an embodiment of a transmitter front-end in accordance with the present invention;

FIG. 8 is a schematic block diagram of another embodiment of a transmitter front-end in accordance with the present invention;

FIGS. 13 and 14 are diagrams of another embodiment of an antenna structure in accordance with the present invention;

FIGS. 15-17 are diagrams of yet another embodiment of an antenna structure in accordance with the present invention;

FIGS. 18 and 19 are diagrams of still another embodiment of an antenna structure in accordance with the present invention;

FIGS. 20 and 21 are diagrams of a further embodiment of an antenna structure in accordance with the present invention;

FIGS. 22 and 23 are diagrams of a still further embodiment of an antenna structure in accordance with the present invention;

FIGS. 24-26 are diagrams of yet a further embodiment of an antenna structure in accordance with the present invention; and FIGS. 27 and 28 are diagrams of a different embodiment of an antenna structure in accordance with the present invention.

DETAILED DESCRIPTION OF THE INVENTION

Figure 1:
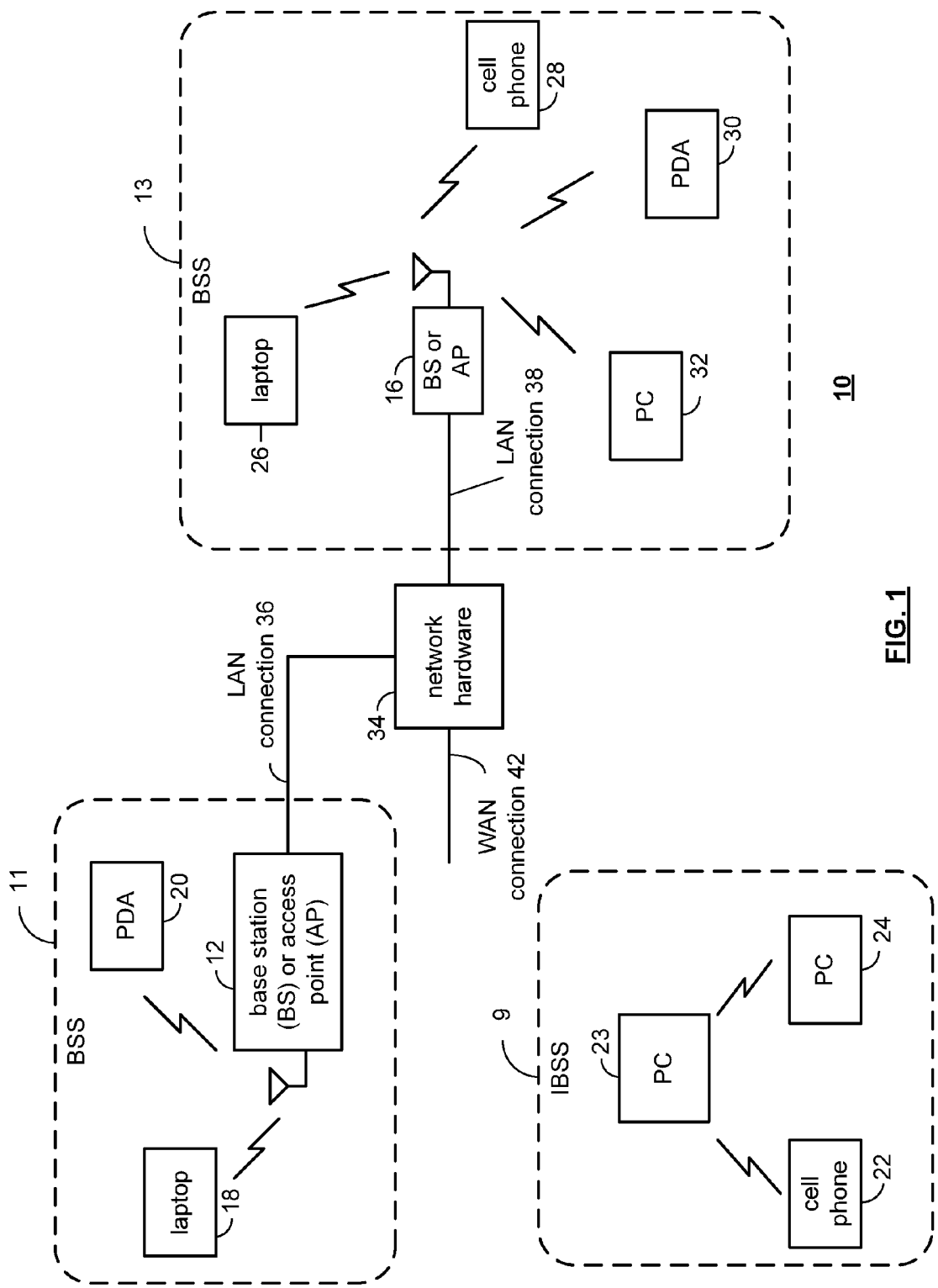
FIG. 1 is a schematic block diagram of a wireless communication system in accordance with the present invention.

FIG. 1 is a schematic block diagram illustrating a communication system 10 that includes a plurality of base stations and/or access points 12, 16, a plurality of wireless communication devices 18-32 and a network hardware component 34. Note that the network hardware 34, which may be a router, switch, bridge, modem, system controller, et cetera provides a wide area network connection 42 for the communication system 10. Further note that the wireless communication devices 18-32 may be laptop host computers 18 and 26, personal digital assistant hosts 20 and 30, personal computer hosts 24 and 32 and/or cellular telephone hosts 22 and 28. The details of the wireless communication devices will be described in greater detail with reference to FIG. 2.

Wireless communication devices 22, 23, and 24 are located within an independent basic service set (IBSS) area and communicate directly (i.e., point to point). In this configuration, these devices 22, 23, and 24 may only communicate with each other. To communicate with other wireless communication devices within the system 10 or to communicate outside of the system 10, the devices 22, 23, and/or 24 need to affiliate with one of the base stations or access points 12 or 16.

The base stations or access points 12, 16 are located within basic service set (BSS) areas 11 and 13, respectively, and are operably coupled to the network hardware 34 via local area network connections 36, 38. Such a connection provides the base station or access point 12 16 with connectivity to other devices within the system 10 and provides connectivity to other networks via the WAN connection 42. To communicate with the wireless communication devices within its BSS 11 or 13, each of the base stations or access points 12-16 has an associated antenna or antenna array. For instance, base station or access point 12 wirelessly communicates with wireless communication devices 18 and 20 while base station or access point 16 wirelessly communicates with wireless communication devices 26-32. Typically, the wireless communication devices register with a particular base station or access point 12, 16 to receive services from the communication system 10.

Typically, base stations are used for cellular telephone systems and like-type systems, while access points are used for in-home or in-building wireless networks (e.g., IEEE 802.11 and versions thereof, Bluetooth, RFID, and/or any other type of radio frequency based network protocol). Regardless of the particular type of communication system, each wireless communication device includes a built-in radio and/or is coupled to a radio. Note that one or more of the wireless communication devices may include an RFID reader and/or an RFID tag.

Figure 2:
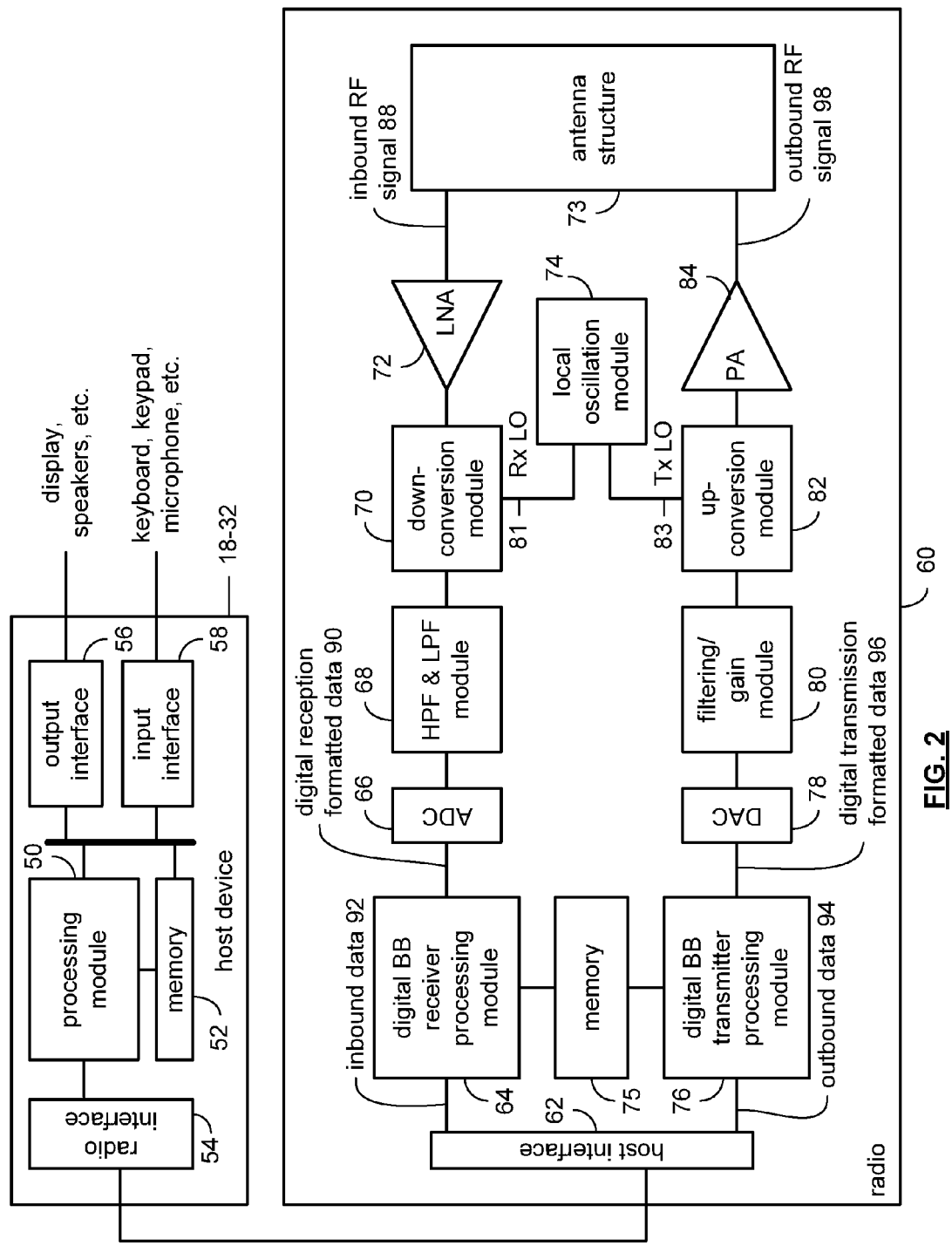
FIG. 2 is a schematic block diagram of a wireless communication device in accordance with the present invention.

FIG. 2 is a schematic block diagram illustrating a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host device 18-32 includes a processing module 50, memory 52, a radio interface 54, an input interface 58, and an output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides data from the processing module 50 to the radio 60. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio 60 via the radio interface 54.

Radio 60 includes a host interface 62, a local oscillation module 74, memory 75, a receiver path, a transmitter path, and an antenna structure 73, which may be on-chip, off-chip, or a combination thereof. The receiver path includes a receiver filter, a low noise amplifier 72, a down conversion module 70, a high pass and/or low pass filter module 68, an analog-to-digital converter 66, and a digital receiver processing module 64. The transmit path includes a digital transmitter processing module 76, a digital-to-analog converter 78, a filtering/gain module 80, an up conversion module 82, a power amplifier 84, and a transmitter filter module. The antenna structure 73 includes at least one antenna.

The digital receiver processing module 64 and the digital transmitter processing module 76, in combination with operational instructions stored in memory 75, execute digital receiver functions and digital transmitter functions, respectively. The digital receiver functions include, but are not limited to, digital intermediate frequency to baseband conversion, demodulation, demapping, depuncturing, decoding, and/or descrambling. The digital transmitter functions include, but are not limited to, scrambling, encoding, puncturing, mapping, modulation, and/or digital baseband to IF conversion. The digital receiver and transmitter processing modules 64 and 76 may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 75 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 and/or 76 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 94 from the host device via the host interface 62. The host interface 62 routes the outbound data 94 to the digital transmitter processing module 76, which processes the outbound data 94 in accordance with a particular wireless communication standard (e.g., IEEE 802.11, Bluetooth, RFID, et cetera) to produce outbound baseband signals 96. The outbound baseband signals 96 will be digital base-band signals (e.g., have a zero IF) or a digital low IF signals, where the low IF typically will be in the frequency range of one hundred kilohertz to a few megahertz.

The digital-to-analog converter 78 converts the outbound baseband signals 96 from the digital domain to the analog domain. The filtering/gain module 80 filters and/or adjusts the gain of the analog signals prior to providing it to the up-conversion mixing module 82. The up conversion mixing module 82 converts the analog baseband or low IF signals into RF signals based on a transmitter local oscillation 83 provided by local oscillation module 74. The power amplifier 84 amplifies the RF signals to produce outbound RF signals 98, which are filtered by the transmitter filter module. One or more of the antennas of the antenna structure 73 transmits the outbound RF signals 98 to a targeted device such as a base station, an access point and/or another wireless communication device.

The radio 60 also receives inbound RF signals 88 via one or more of the antennas of the antenna structure 73, which were transmitted by a base station, an access point, or another wireless communication device. The antenna(s) provides the inbound RF signals 88 to the receiver filter module, which bandpass filters the inbound RF signals 88. The Rx filter provides the filtered RF signals to low noise amplifier 72, which amplifies the signals 88 to produce an amplified inbound RF signals. The low noise amplifier 72 provides the amplified inbound RF signals to the down conversion mixing module 70, which converts the amplified inbound RF signals into an inbound low IF signals or baseband signals based on a receiver local oscillation 81 provided by local oscillation module 74. The down conversion module 70 provides the inbound low IF signals or baseband signals to the filtering/gain module 68. The high pass and low pass filter module 68 filters the inbound low IF signals or the inbound baseband signals to produce filtered inbound signals.

The analog-to-digital converter 66 converts the filtered inbound signals from the analog domain to the digital domain to produce inbound baseband signals 90, where the inbound baseband signals 90 will be digital base-band signals or digital low IF signals, where the low IF typically will be in the frequency range of one hundred kilohertz to a few megahertz. The digital receiver processing module 64 decodes, descrambles, demaps, and/or demodulates the inbound baseband signals 90 to recapture inbound data 92 in accordance with the particular wireless communication standard being implemented by radio 60. The host interface 62 provides the recaptured inbound data 92 to the host device 18-32 via the radio interface 54.

As one of average skill in the art will appreciate, the wireless communication device of FIG. 2 may be implemented using one or more integrated circuits. For example, the host device may be implemented on one integrated circuit, the digital receiver processing module 64, the digital transmitter processing module 76 and memory 75 may be implemented on a second integrated circuit, and the remaining components of the radio 60, may be implemented on a third integrated circuit. As an alternate example, the radio 60 may be implemented on a single integrated circuit. As yet another example, the processing module 50 of the host device and the digital receiver and transmitter processing modules 64 and 76 may be a common processing device implemented on a single integrated circuit. Further, the memory 52 and memory 75 may be implemented on a single integrated circuit and/or on the same integrated circuit as the common processing modules of processing module 50 and the digital receiver and transmitter processing module 64 and 76.

Figure 3:
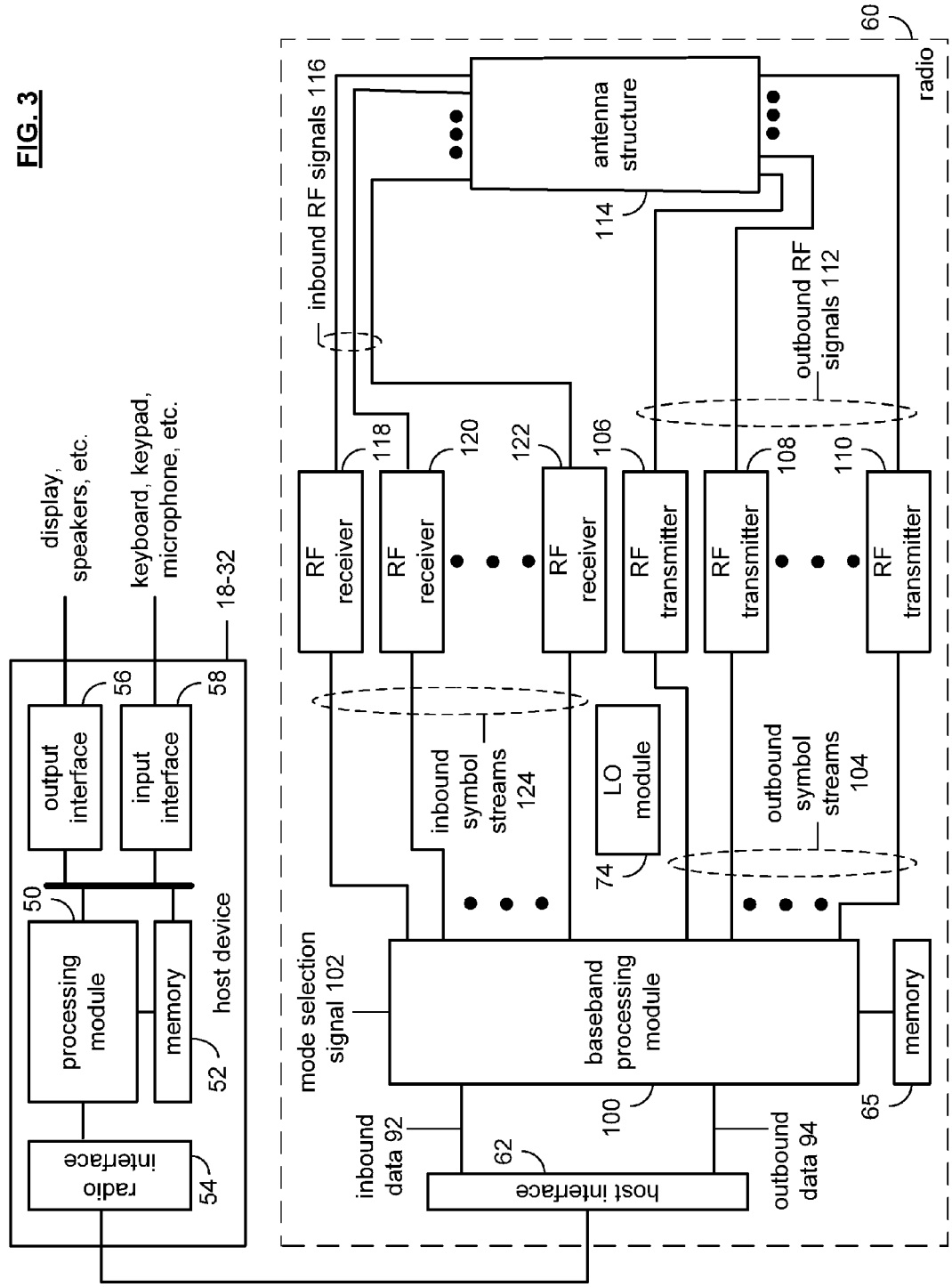
FIG. 3 is a schematic block diagram of another wireless communication device in accordance with the present invention.

FIG. 3 is a schematic block diagram illustrating a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host device 18-32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides data from the processing module 50 to the radio 60. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio 60 via the radio interface 54.

Radio 60 includes a host interface 62, memory 64, a receiver path, a transmit path, a local oscillation module 74, and an antenna 114, which may be on-chip, off-chip, or a combination thereof. The receive path includes a baseband processing module 100 and a plurality of RF receivers 118-120. The transmit path includes baseband processing module 100 and a plurality of radio frequency (RF) transmitters 106-110. The baseband processing module 100, in combination with operational instructions stored in memory 65 and/or internally operational instructions, executes digital receiver functions and digital transmitter functions, respectively. The digital receiver functions include, but are not limited to, digital intermediate frequency to baseband conversion, demodulation, constellation demapping, depuncturing, decoding, de-interleaving, fast Fourier transform, cyclic prefix removal, space and time decoding, and/or descrambling. The digital transmitter functions include, but are not limited to, scrambling, encoding, puncturing, interleaving, constellation mapping, modulation, inverse fast Fourier transform, cyclic prefix addition, space and time encoding, and digital baseband to IF conversion. The baseband processing modules 100 may be implemented using one or more processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 65 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 100 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 94 from the host device via the host interface 62. The baseband processing module 64 receives the outbound data 88 and, based on a mode selection signal 102, produces one or more outbound symbol streams 90. The mode selection signal 102 will indicate a particular mode of operation that is compliant with one or more specific modes of the various IEEE 802.11, RFID, etc., standards. For example, the mode selection signal 102 may indicate a frequency band of 2.4 GHz, a channel bandwidth of 20 or 22 MHz and a maximum bit rate of 54 megabits-per-second. In this general category, the mode selection signal will further indicate a particular rate ranging from 1 megabit-per-second to 54 megabits-per-second. In addition, the mode selection signal will indicate a particular type of modulation, which includes, but is not limited to, Barker Code Modulation, BPSK, QPSK, CCK, 16 QAM and/or 64 QAM. The mode select signal 102 may also include a code rate, a number of coded bits per subcarrier (NBPSC), coded bits per OFDM symbol (NCBPS), and/or data bits per OFDM symbol (NDBPS). The mode selection signal 102 may also indicate a particular channelization for the corresponding mode that provides a channel number and corresponding center frequency. The mode select signal 102 may further indicate a power spectral density mask value and a number of antennas to be initially used for a MIMO communication.

The baseband processing module 100, based on the mode selection signal 102 produces one or more outbound symbol streams 104 from the outbound data 94. For example, if the mode selection signal 102 indicates that a single transmit antenna is being utilized for the particular mode that has been selected, the baseband processing module 100 will produce a single outbound symbol stream 104. Alternatively, if the mode select signal 102 indicates 2, 3 or 4 antennas, the baseband processing module 100 will produce 2, 3 or 4 outbound symbol streams 104 from the outbound data 94.

Depending on the number of outbound streams 104 produced by the baseband module 10, a corresponding number of the RF transmitters 106-110 will be enabled to convert the outbound symbol streams 104 into outbound RF signals 112. The RF transmitters 106-110 provide the outbound RF signals 112 to a corresponding antenna of the antenna structure 114.

When the radio 60 is in the receive mode, the antenna structure 114 receives one or more inbound RF signals 116 and provides them to one or more RF receivers 118-122. The RF receiver 118-122 converts the inbound RF signals 116 into a corresponding number of inbound symbol streams 124. The number of inbound symbol streams 124 will correspond to the particular mode in which the data was received. The baseband processing module 100 converts the inbound symbol streams 124 into inbound data 92, which is provided to the host device 18-32 via the host interface 62.

As one of average skill in the art will appreciate, the wireless communication device of FIG. 3 may be implemented using one or more integrated circuits. For example, the host device may be implemented on one integrated circuit, the baseband processing module 100 and memory 65 may be implemented on a second integrated circuit, and the remaining components of the radio 60, may be implemented on a third integrated circuit. As an alternate example, the radio 60 may be implemented on a single integrated circuit. As yet another example, the processing module 50 of the host device and the baseband processing module 100 may be a common processing device implemented on a single integrated circuit. Further, the memory 52 and memory 65 may be implemented on a single integrated circuit and/or on the same integrated circuit as the common processing modules of processing module 50 and the baseband processing module 100.

Figure 4:
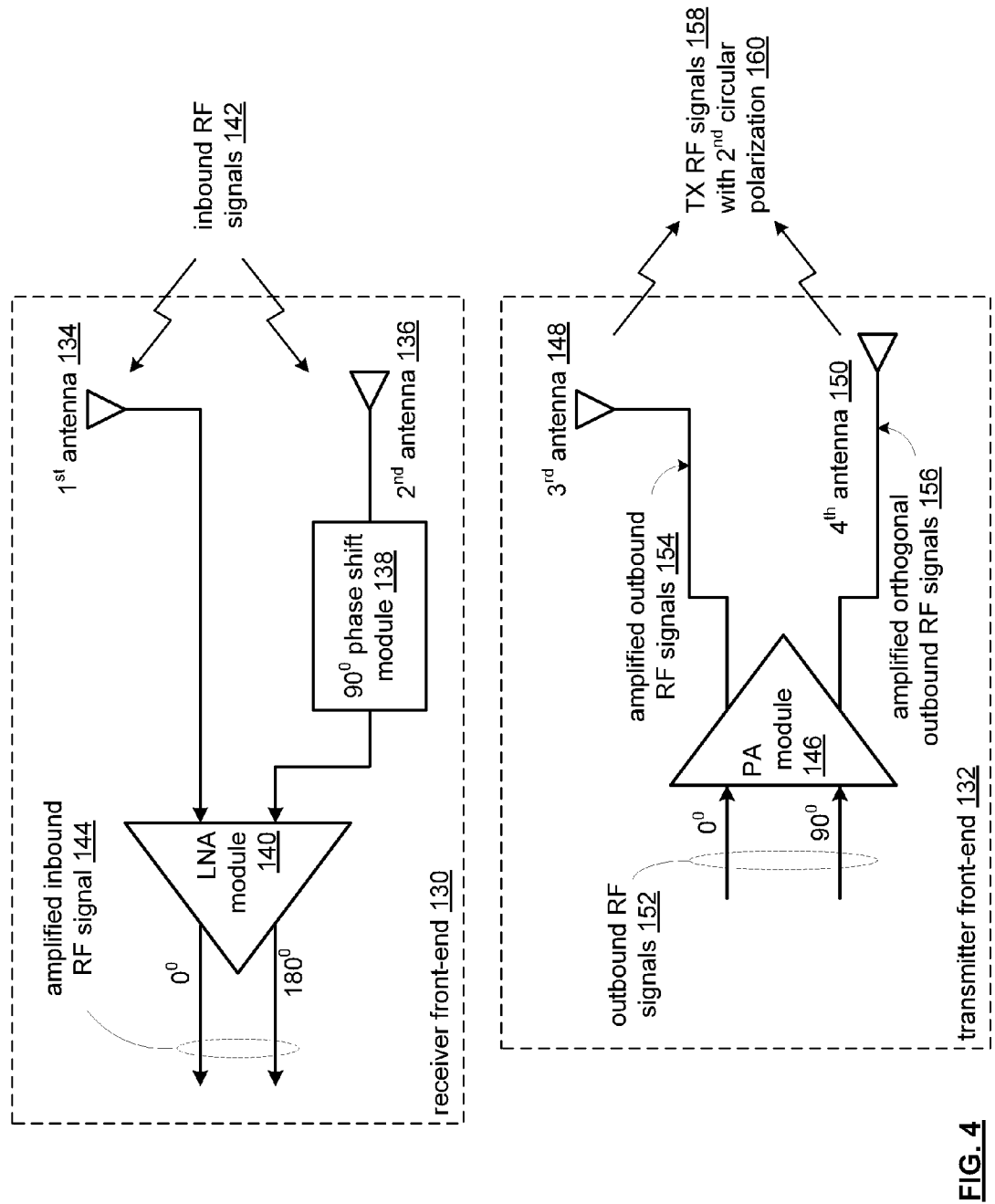
FIG. 4 is a schematic block diagram of an embodiment of a transceiver front-end in accordance with the present invention.

FIG. 4 is a schematic block diagram of an embodiment of a transceiver front-end that includes a receiver front-end 130 and a transmitter front-end 132. The receiver front-end 130 includes a first antenna, 134, a second antenna 136, a 90° phase shift module 138, and a low noise amplifier (LNA) module 140. The first and second antennas 134 and 136 are operably coupled to receive inbound RF signals 142. The first and second antennas may be of a like construction such as a dipole antenna, a monopole antenna, a planer antenna (e.g., a meandering line) on a supporting substrate (e.g., a printed circuit board), and/or a planer helical antenna as described in co-pending patent application entitled PLANER HELICAL ANTENNA, having a filing date of Mar. 21, 2006, and a Ser. No. 11/386,247, which is incorporated herein by reference. Regardless of the antenna construction, the first and second antennas are orientated (e.g., having their direction of transmission/reception at 90° to each other) to provide a first directional circular polarization.

The ninety degree phase shift module 138 is operably coupled to phase shift the received RF signals from the second antenna 136. In one embodiment, the ninety degree phase shift module 138 may be a one-quarter wave length delay module. In other embodiments, the ninety degree phase shift module 138 may be a trigonometry module that performs the function of $\cos(\alpha+\beta)$, where $\alpha$ represents $2\pi\omega_{RF}$, and $\beta$ represents $\pi/2$ (i.e., 90°).

The low noise amplifying module 140, which may include one or more single-ended or differential low noise amplifiers and may further include single-ended to differential conversion circuits (e.g., a transformer balun), is operably coupled to amplify the first received RF signals from the first antenna 134 and the shifted received RF signals from the ninety degree phase shift module 138 to produce amplified inbound RF signal 144. In this embodiment, the amplified inbound RF signal 144 includes a zero phase shift component and a 180° phase shift component. In other words, the amplified inbound RF signal 144 is a differential signal.

The transmitter front-end 132 includes a power amplifier (PA) module 146, a third antenna 148, and a fourth antenna 150. The power amplifying module 146, which may include one or more single-ended or differential power amplifiers and may further include single-ended to differential conversion circuits (e.g., a transformer balun), amplifies outbound RF signals 152 to produce amplified outbound RF signals 154 and amplified orthogonal outbound RF signals 156. In this embodiment, the outbound RF signals 152 include a 0° phase shift component and a 90° phase shift component, which, for example, may be representative of an in-phase component and a quadrature component of an outbound RF signal.

The third antenna 148 is operably coupled to transmit the amplified outbound RF signals 154 and the fourth antenna 150 is operably coupled to transmit the amplified orthogonal outbound RF signals 156 to produce TX RF signals 158. The third and fourth antennas 148 and 150 may be of a like construction such as a dipole antenna, a monopole antenna, a planer antenna (e.g., a meandering line) on a supporting substrate (e.g., a printed circuit board), and/or a planer helical antenna as described in co-pending patent application entitled PLANER HELICAL ANTENNA, having a filing date of Mar. 21, 2006, and a Ser. No. 11/386,247, which is incorporated herein by reference. Regardless of the antenna construction, the third and fourth antennas 148 and 150 are orientated (e.g., having their direction of transmission/reception at 90° to each other) to provide a second directional circular polarization 160. In this embodiment, the circular polarization of the first directional circular polarization is opposite of the circular polarization of the second directional circular polarization.

Figure 9:
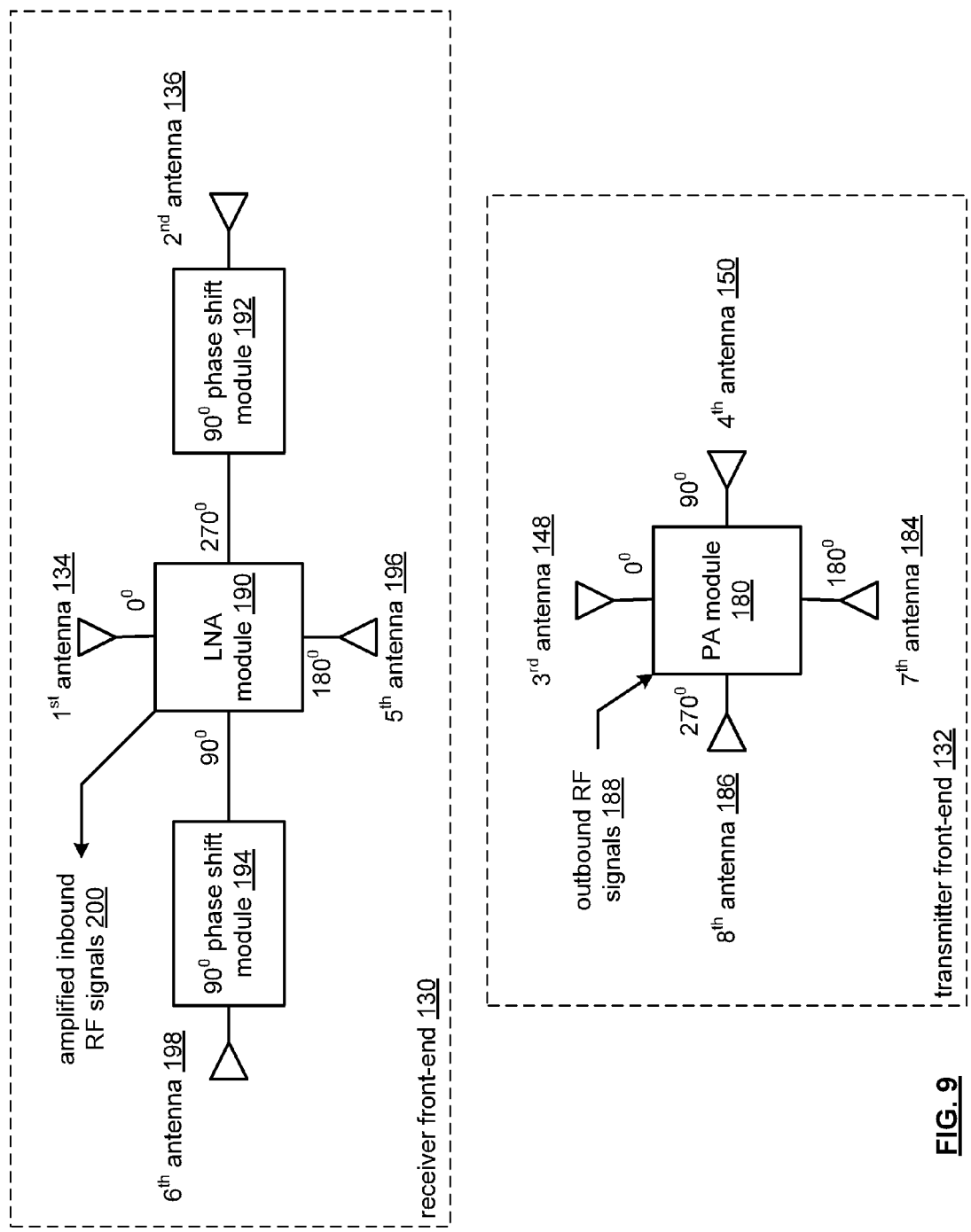
FIG. 9 is a schematic block diagram of another embodiment of a transceiver front-end in accordance with the present invention.
Figure 11:
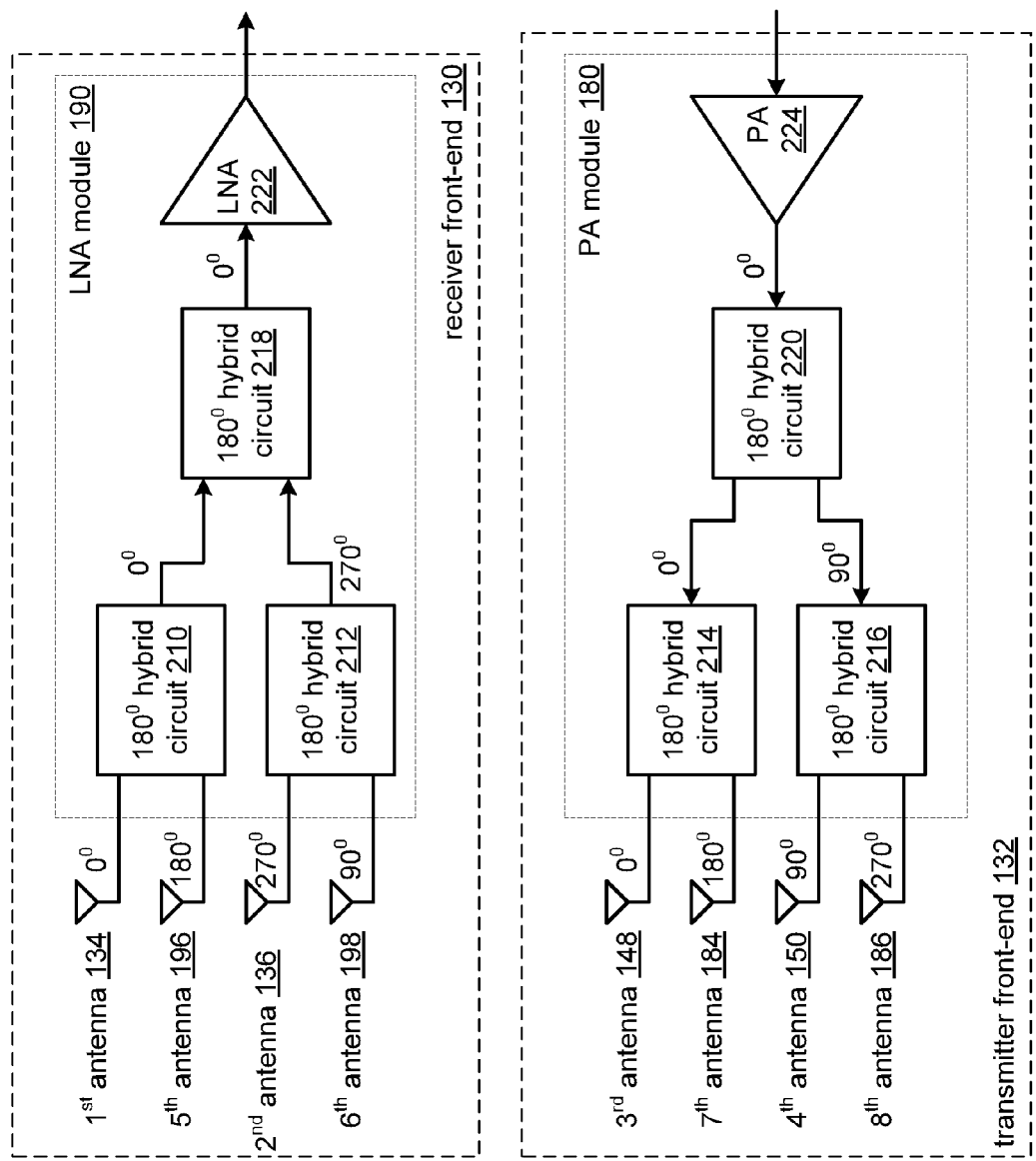
FIG. 11 is a schematic block diagram of yet another embodiment of a transceiver front-end in accordance with the present invention.

As one of ordinary skill in the art will appreciate, the LNA 72, antenna structure 73, and PA 84 of FIG. 2 may be implemented in accordance with the transceiver front-end of FIG. 4, 9, or 11. As one of ordinary skill in the art will further appreciate, each of the RF receivers 118-122 includes an LNA and that each of the RF transmitters 106-108 includes a PA. As such, an LNA of one of the RF receivers, a PA of one of the RF transmitters, and antennas of the antenna structure 114 may be implemented in accordance with the transceiver front-end of FIG. 4, 9, or 11.

Figure 6:
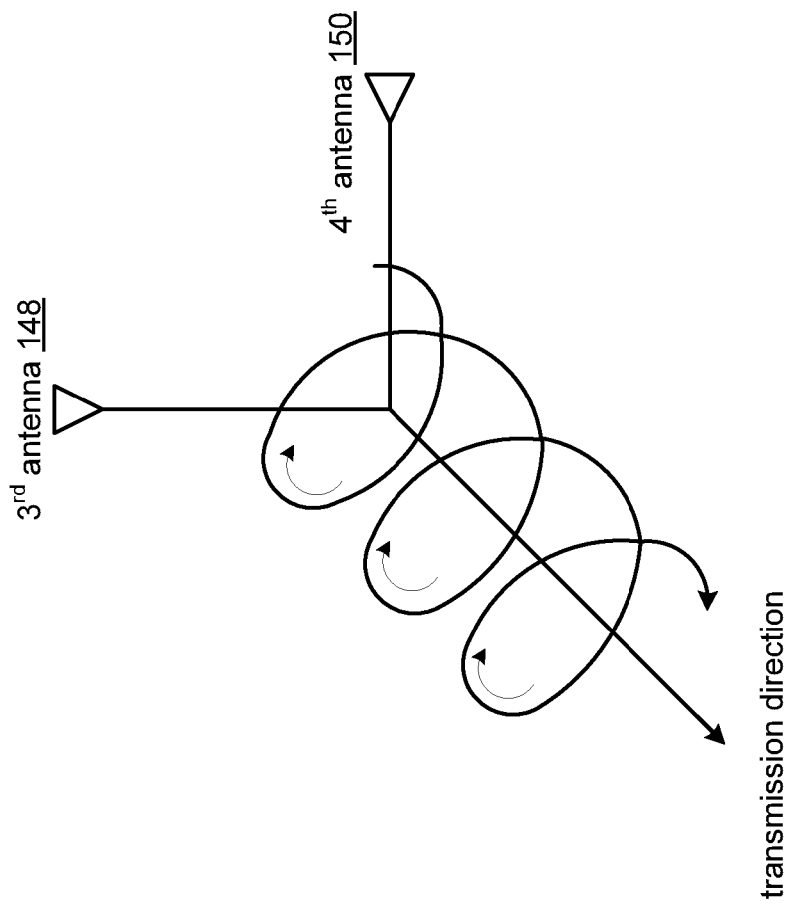
FIGS. 5 and 6 are diagrams illustrating circular polarization in different directions in accordance with the present invention.
Figure 5:
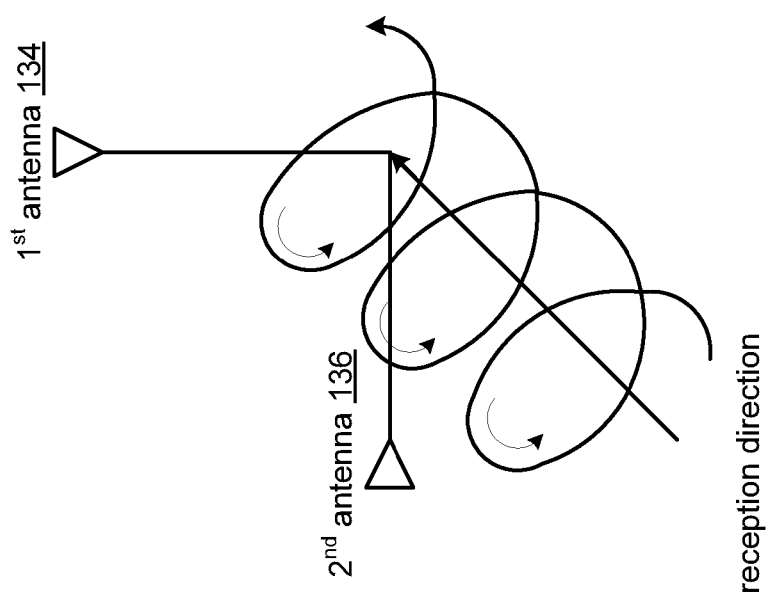

FIGS. 5 and 6 are diagrams illustrating the first and second circular polarizations of the first, second, third, and fourth antennas 134, 136, 148, and 150 of FIG. 4. In this example, the reception circular polarization is in a counter-clockwise rotation based on the orientation of the first and second antennas 134 and 136 and the transmission circular polarization is in a clockwise rotation based on the orientation of the third and fourth antennas 148 and 150. As one of ordinary skill in the art will appreciate, the orientation of the first and second antennas and the orientation of the third and fourth antennas may be switched such that the transmit path has a counter-clockwise circular polarization and the receive path has a clockwise circular polarization.

FIG. 7 is a schematic block diagram of an embodiment of a transmitter front-end 132 of FIG. 4. In this embodiment, the power amplifier module 146 includes a first power amplifier 160 and a second power amplifier 162. The first power amplifier 160 amplifies the 0° phase shifted component of the outbound RF signals 152 and provides the amplified signals to the third antenna 148. The second power amplifier 162 amplifies the 90° phase shifted component of the outbound RF signals 152 and provides the amplified signals to the fourth antenna 150. As one of ordinary skill in the art will appreciate, the first and second power amplifiers 160 and 162 may be single-ended amplifiers, differential amplifiers, or differential input, single-ended output amplifiers.

FIG. 8 is a schematic block diagram of another embodiment of a transmitter front-end 132 of FIG. 4. In this embodiment, the power amplifier module 146 includes a first differential power amplifier 174, a second differential power amplifier 176, a first transformer balun 170, and a second transformer balun 178. The first PA 174 is operably coupled to amplify a 0° and a 180° phase shifted components of the outbound RF signals 152 and the second PA 176 is operably coupled to amplify a 90° and a 270° phase shifted components of the outbound RF signals 152. In one embodiment, the 0° and a 180° phase shifted components may be a differential in-phase signal component of the outbound RF signals 152 and the 90° and a 270° phase shifted components may be a differential quadrature signal component of the outbound RF signals 152.

The first transformer balun 170 converts the differential output of the first PA 174 into a single-ended signal that is provided to the third antenna 148 and the second transformer balun 172 converts the differential output of the second PA 176 into a single-ended signal that is provided to the fourth antenna 150. The third and fourth antennas 148 and 150 transmit the RF signals as previously discussed.

FIG. 9 is a schematic block diagram of another embodiment of a transceiver front-end that includes the receiver front-end 130 and the transmitter front-end 132. In this embodiment, the receiver front-end 130 includes a low noise amplifier (LNA) module 190, first and second ninety degree phase shift module 192 and 194, and first, second, fifth and sixth antennas 134, 136, 196, and 198. The antennas 134, 136, 196, and 198 are operably coupled to receive inbound RF signals and may be of a like construction such as a dipole antenna, a monopole antenna, a planer antenna (e.g., a meandering line) on a supporting substrate (e.g., a printed circuit board), and/or a planer helical antenna as described in co-pending patent application entitled PLANER HELICAL ANTENNA, having a filing date of Mar. 21, 2006, and a Ser. No. 11/386,247, which is incorporated herein by reference. Regardless of the antenna construction, the antennas are orientated (e.g., having their direction of transmission/reception at 90° to each other) to provide the first directional circular polarization.

The ninety degree phase shift modules 192 and 194 are operably coupled to phase shift the received RF signals from the second and sixth antennas 136 and 198 respectively. In one embodiment, the ninety degree phase shift modules 192 and 194 may be one-quarter wave length delay modules. In other embodiments, the ninety degree phase shift modules 192 and 194 may be trigonometry modules that perform the function of $\cos(\alpha+\beta)$, where $\alpha$ represents $2\pi\omega_{RF}$, and $\beta$ represents $\pi/2$ (i.e., 90°).

The low noise amplifying module 190, which may include one or more single-ended or differential low noise amplifiers and may further include single-ended to differential conversion circuits (e.g., a transformer balun), is operably coupled to amplify a 0°, 90°, 180°, and 270° representation of the received inbound RF signals from the antennas 134 and 196 and from the ninety degree phase shift modules 192 and 194 to produce amplified inbound RF signals 200. In one embodiment, the amplified inbound RF signals 200 may include a zero phase shift component and a 180° phase shift component. In other words, the amplified inbound RF signals 200 may be differential signals.

The transmitter front-end 132 includes a power amplifier (PA) module 180 and third, fourth, seventh, and eighth antennas 148, 150, 184, and 186. The power amplifying module 180, which may include one or more single-ended or differential power amplifiers and may further include single-ended to differential conversion circuits (e.g., a transformer balun), amplifies outbound RF signals 188 to produce 0°, 90°, 180°, and 270° phase shifted amplified outbound RF signals.

The antennas 148, 250, 284, and 186 are operably coupled to transmit the corresponding phase shifted component of the amplified outbound RF signals 188. Note that the antennas 148, 150, 184, and 186 may be of a like construction such as a dipole antenna, a monopole antenna, a planer antenna (e.g., a meandering line) on a supporting substrate (e.g., a printed circuit board), and/or a planer helical antenna as described in co-pending patent application entitled PLANER HELICAL ANTENNA, having a filing date of Mar. 21, 2006, and a Ser. No. 11/386,247, which is incorporated herein by reference. Regardless of the antenna construction, the antennas 148, 150, 184, and 186 are orientated (e.g., having their direction of transmission/reception at 90° to each other) to provide a second directional circular polarization. In this embodiment, the circular polarization of the first directional circular polarization is opposite of the circular polarization of the second directional circular polarization.

Figure 10:
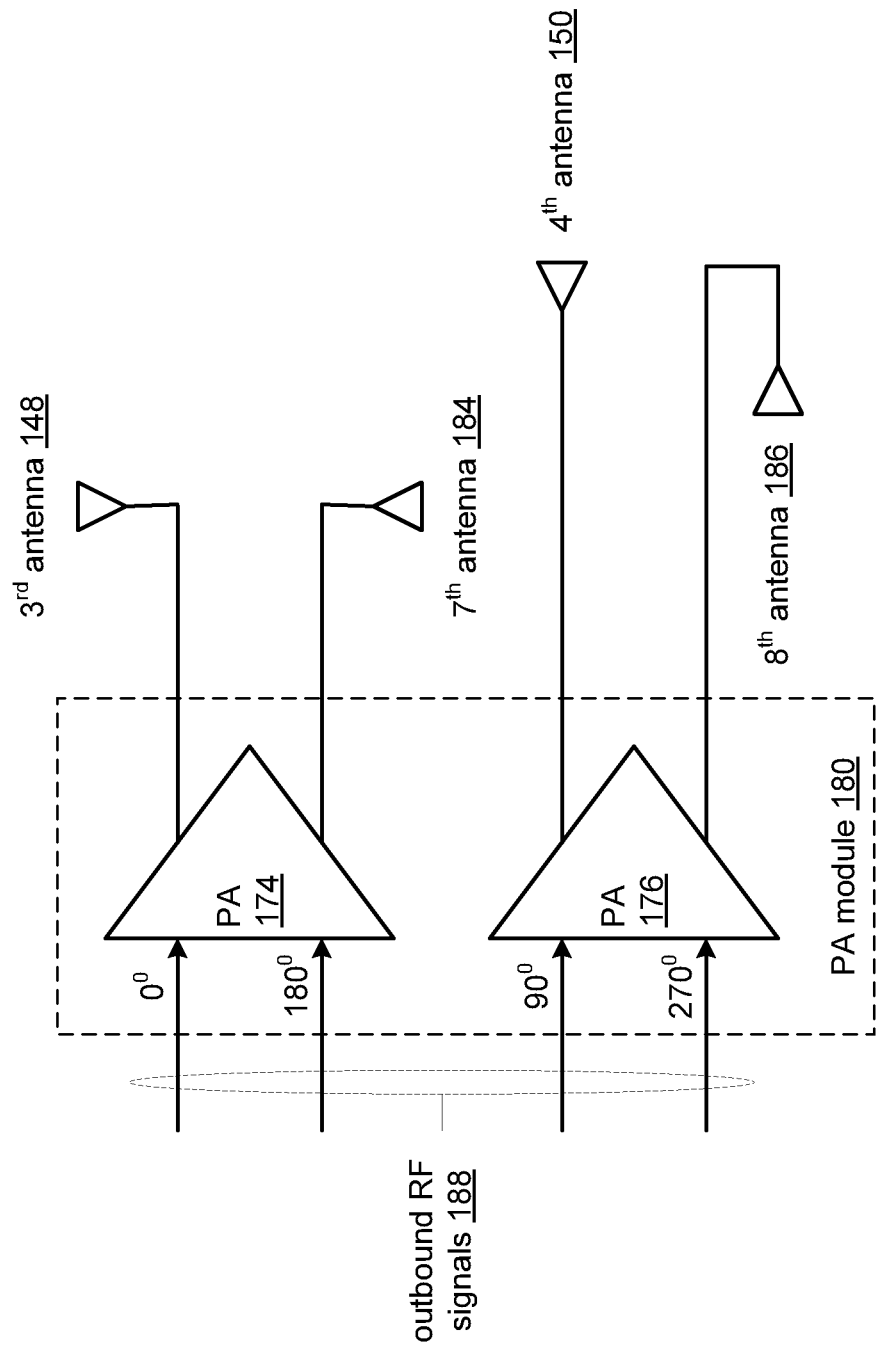
FIG. 10 is a schematic block diagram of yet another embodiment of a transmitter front-end in accordance with the present invention.

FIG. 10 is a schematic block diagram of yet another embodiment of the transmitter front-end 132. In this embodiment, the PA module 180 includes a pair of differential power amplifiers 174 and 176. PA 174 is operably coupled to amplify the 0° and 180° degree phase shifted representation of the outbound RF signals 188 and to provide the corresponding amplified RF signals to the third and seventh antennas 148 and 184. PA 176 is operably coupled to amplify the 90° and 270° degree phase shifted representation of the outbound RF signals 188 and to provide the corresponding amplified RF signals to the fourth and eighth antennas 150 and 186. In one embodiment, the 0° and 180° degree phase shifted representation of the outbound RF signals 188 may correspond to a differential in-phase signal component of the outbound RF signals 188 and the 90° and 270° degree phase shifted representation of the outbound RF signals 188 may correspond to a differential quadrature signal component of the outbound RF signals 188.

FIG. 11 is a schematic block diagram of yet another embodiment of a transceiver front-end that includes the receiver front-end 130 and the transmitter front-end 132. In this embodiment, the receiver front-end 130 includes the LNA module 190 and antennas 134, 136, 196, and 198. The LNA module 190 includes a plurality of hybrid circuits 210, 212, and 218 and a low noise amplifier 222. The low noise amplifier 222 may be a single-ended amplifier or a differential amplifier.

The first hybrid circuit module 210 is operably coupled to produce a first phase combined receive RF signal (e.g., 0°) from a first phase shifted receive RF signal (e.g., 0°) received from the $1^{st}$ antenna 134 and a second phase shifted receive RF signal (e.g., 180°) received from the $5^{th}$ antenna 196. For example, the first hybrid circuit 210 may perform the function of $\cos(2\pi\omega_{RF}+0)-\cos(2\pi\omega_{RF}+180)$.

The second hybrid circuit module 212 is operably coupled to produce a second phase combined receive RF signal (e.g., 270°) from a third phase shifted receive RF signal (e.g., 270°) received from the $2^{nd}$ antenna 136 and a fourth phase shifted receive RF signal (e.g., 90°) received from the $6^{th}$ antenna 198. For example, the second hybrid circuit 212 may perform the function of $\cos(2\pi\omega_{RF}+270)-\cos(2\pi\omega_{RF}+90)$.

The third hybrid circuit module 218 is operably coupled to produce a receive RF signal from the first and second phase combined receive RF signals, i.e., the outputs of the first and second hybrid circuits 210 and 212. In one embodiment, the third hybrid circuit 218 performs the function of $\cos(2\pi\omega_{RF}+0)+90°$ phase shift of $[\cos(2\pi\omega_{RF}+270)]$.

The transmitter front-end 132 includes a plurality of antennas 148, 150, 184, and 186 and a power amplifier module 180. The PA module 180 includes a power amplifier 224 and a plurality of hybrid circuits 214, 216, and 220. The PA 224 is operably coupled to amplify an outbound RF signal to produce an amplified RF signal. The first hybrid circuit module 220 is operably coupled to produce a first phase shifted transmit RF signal (e.g., 90°) from a transmit RF signal (i.e., the amplified RF signal). The first hybrid circuit module 220 provides the transmit RF signal (e.g., 0°) to the second hybrid circuit module 214 and the first phase shifted transmit RF signal to the third hybrid circuit module 216. In one embodiment, the first hybrid circuit module 220 functions to add a 90° phase offset to the transmit RF signal (e.g., $\cos(2\pi\omega_{RF})$) to produce the first phase shifted transmit RF signal (e.g., $\cos(2\pi\omega_{RF}+90)$) and passes the transmit RF signal through a delay that substantially matches the time it takes to add the 90° phase offset.

The second hybrid circuit module 214 is operably coupled to produce a second phased shifted transmit RF signal (e.g., 180°) from the transmit RF signal (e.g., 0°). The second hybrid circuit module 214 provides the transmit RF signal (e.g., 0°) to the third antenna 148 and provides the second phase shifted transmit RF signal (e.g., 180°) to the 7$^{th}$ antenna 184. In one embodiment, the second hybrid circuit module 214 inverts the transmit RF signal (e.g., $\cos(2\pi\omega_{RF})$ to produce the second phase shifted transmit RF signal (e.g., $\cos(2\pi\omega_{RF}+180)$) and passes the transmit RF signal through a delay that substantially matches the time it takes to invert the signal.

The third hybrid circuit module 216 is operably coupled to produce a third phase shifted transmit RF signal (e.g., 270°) from the first phase shifted transmit RF signal (e.g., 90°). The third hybrid circuit module 216 provides the third phase shifted transmit RF signal (e.g., 270°) to the 8$^{th}$ antenna 186 and provides the first phase shifted transmit RF signal (e.g., 90°) to the 4$^{th}$ antenna. In one embodiment, the third hybrid circuit module 216 inverts the first phase shifted transmit RF signal (e.g., $\cos(2\pi\omega_{RF}+90)$ to produce the third phase shifted transmit RF signal (e.g., $\cos(2\pi\omega_{RF}+270)$) and passes the first phase shifted transmit RF signal through a delay that substantially matches the time it takes to invert the signal.

Figure 12:
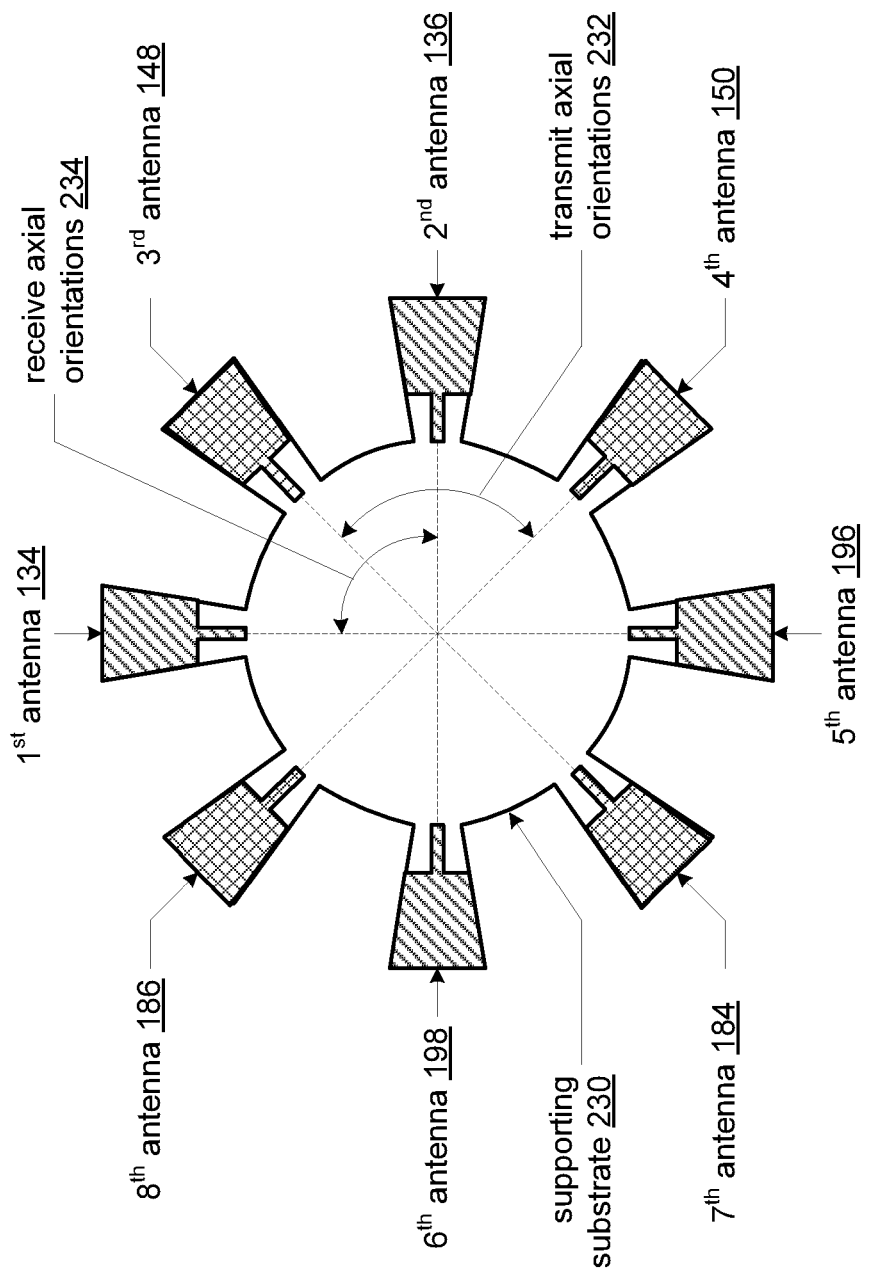
FIG. 12 is a diagram of an embodiment of an antenna structure in accordance with the present invention.

FIG. 12 is a diagram of an embodiment of an antenna structure that may be used in the transceiver front-end of FIG. 9 or 11. The antenna structure includes a plurality of transmit planer antennas and a plurality of receive planer antennas on a supporting structure 230. The supporting substrate 230 may be an integrated circuit package substrate such as a printed circuit board (PCB), a PCB, a low temperature co-fired ceramic (LTCC) substrate, or an organic substrate.

The plurality of transmit planer antennas (e.g., the third, fourth, seventh, and/or eighth antennas 148, 150, 184, 186) have a plurality of transmit axial orientations 232, where each of the transmit planer antennas is positioned in accordance with a corresponding one of the transmit axial orientations 232. Each of the transmit planer antennas has a conductive antenna pattern on at least the first surface of the supporting substrate 230. For example, the conductive antenna pattern may be a meandering line on the first surface, a metal trace on the first surface, a coil on the first surface, and/or a planer helical antenna as described in co-pending patent application entitled PLANER HELICAL ANTENNA, having a filing date of Mar. 21, 2006, and a Ser. No. 11/386,247.

The plurality of receive planer antennas (e.g., the first, second, fifth, and sixth antennas 134, 136, 196, and 198) have a plurality of receive axial orientations 234, where each of the receive planer antennas is positioned in accordance with a corresponding one of the receive axial orientations 232. Each of the plurality of receive planer antennas has the conductive antenna pattern on the first surface of the supporting substrate. For example, the conductive antenna pattern may be a meandering line on the first surface, a metal trace on the first surface, a coil on the first surface, and/or a planer helical antenna as described in co-pending patent application entitled PLANER HELICAL ANTENNA, having a filing date of Mar. 21, 2006, and a Ser. No. 11/386,247. As shown, the transmit axial orientations 232 are interleaved with the receive axial orientations 234.

FIGS. 13 and 14 are top and cross-sectional diagrams of another embodiment of an antenna structure. In this embodiment, the antenna structure includes a supporting substrate 230 that supports antennas 1-8 (134, 136, 148, 150, 184, 186, 196, and 198) and transmit and/or receive hybrid circuitry 240. The transmit and/or receive hybrid circuitry 240 may include one or more of the of the hybrid circuits 210, 212, 214, 216, 218, and 220 as shown in FIG. 11.

In this embodiment, each of the antennas include a tapered planer helical antenna layout as described in co-pending patent application entitled PLANER HELICAL ANTENNA, having a filing date of Mar. 21, 2006, and a Ser. No. 11/386,247. As shown in FIG. 14, an antenna (e.g., the 2$^{nd}$ and 6$^{th}$ antennas 136 and 198) includes a 1$^{st}$ helical pattern 244 on a first surface of the supporting substrate 230 and a 2$^{nd}$ helical pattern 246 on a second surface of the supporting substrate 230. The 1$^{st}$ and 2$^{nd}$ helical patterns 244 and 246 may be interconnected by vias through the supporting substrate 230 or conductive end wrap-arounds.

As is also shown in FIG. 14, a ground pattern 242 is on the second surface of the supporting substrate 230 and is approximately centered at an intersection of the transmit and receive plurality of axial orientations 232 and 234 (not shown in FIG. 13 for clarity of illustration but are shown in FIG. 12). Note that the antennas are off-center of the intersection. The ground pattern 242 is of a conductive material and coupled to a DC or AC ground for the antenna structure. The geometric shape of the ground pattern 242 may vary from a circle, an oval, a square, a rectangle, and/or a combination thereof to provide an effective ground plane for the antenna structure.

As an alternative embodiment, the antennas may include an conductive antenna pattern that is only on the first surface of the supporting substrate 230. In this embodiment, the ground pattern 242 may cover more or less of the second surface of the supporting substrate than shown. In yet another alternative embodiment, the ground pattern 242 and/or the transmit and/or receive hybrid circuitry 240 may be on one or both of the surfaces of the supporting substrate.

FIGS. 15-17 are respectively top, side, and bottom diagrams of yet another embodiment of an antenna structure. In this embodiment, the antenna structure includes a first planer helical antenna 256, a second planer helical antenna 258, and a ground pattern 268. The first planer helical antenna 256 is along a first axial orientation 270 and includes a first helical conductive pattern 260 on a first surface 252 of a supporting substrate 250 (e.g., a PCB, a LTCC substrate, or an organic substrate) and a second helical conductive pattern 262 on a second surface 254 of the supporting substrate 250. As shown in FIG. 16, the first and second helical conductive patterns 260 and 262 of the first planer helical antenna 256 are interconnected, which may be done by vias.

The second planer helical antenna 258 is along a second axial orientation 272 and includes the first helical conductive pattern 264 on the first surface 252 of the supporting substrate 250 and the second helical conductive pattern 266 on the second surface 254 of the supporting substrate 250. As shown in FIG. 16, the first and second helical conductive patterns 264 and 266 of the second planer helical antenna 258 are interconnected. Note that the different axial orientations (e.g., 270 and 272) may be ninety degrees, may be more than ninety degrees, or may be less than ninety degrees to provide different polarizations and/or in-air combining for the first and second planer helical antennas 256 and 258.

The ground pattern 268 on the second surface 254 of the supporting substrate 250 provides a ground connection for the first and second planer helical antennas 256 and 258. As shown in FIG. 17, the ground pattern 268 is approximately centered at an intersection of the first and second axial orientations 270 and 272 and the first and second planer helical antennas 256 and 258 are off-center of the intersection. Note that the first and second planer helical antennas 256 and 258 may be implemented as described in co-pending patent application entitled PLANER HELICAL ANTENNA, having a filing date of Mar. 21, 2006, and a Ser. No. 11/386,247.

FIGS. 18 and 19 are respectively top and bottom diagrams of another embodiment of an antenna structure, which includes a first planer helical antenna 256, a second planer helical antenna 258, and a ground pattern 268 as described with reference to FIGS. 15-17. In this embodiment, the ground pattern 268 includes a first geometric pattern and a radial wall. The ground pattern 268 is of a conductive material (e.g., copper, silver, gold, etc.) that is commonly used on supporting substrates (e.g., PCB). As shown, the first geometric shape is approximately centered at the intersection of the first and second axial orientations. The geometric shape may be a circle, an oval, a square, a rectangle, and/or a combination thereof to provide an effective ground plane for the antenna structure.

The radial wall is electrically coupled to the first geometric shape and extends at least a length of the second helical conductive pattern 266 of the first and second planer helical antennas 256 and 258 along an axis that is between the first and second axial orientations. As such, the radial wall is providing an electrical isolation between the antennas 256 and 258. In another embodiment, a corresponding image 276 of the radial wall 274 may be placed on the first surface 252 of the supporting structure 250. In this embodiment, the corresponding image 276 of the radial wall is of the conductive material and is electrically coupled to the ground pattern 268. Note that the radial wall 274 and the corresponding image 276 may be a first metal trace that is substantially parallel to the second surface 254 and/or a second metal trace that is substantially perpendicular to the second surface 254.

FIGS. 20 and 21 are respectively top and bottom diagrams of another embodiment of an antenna structure. In this embodiment, the antenna structure includes four planer helical antennas 256, 258, 280, and 282 positioned along respective axial orientations 270, 272, 284, and 286 on the supporting substrate 250. Note that the different axial orientations (e.g., 270, 272, 284, and 286) may be at ninety degrees with respect to each other and/or may be less than ninety degrees with respect to each other to provide different polarizations and/or in-air combining for the planer helical antennas 256, 258, 280, and 282.

Each of the antennas 256, 258, 280, and 282 includes $1^{st}$ and $2^{nd}$ helical conductive patterns 260, 262, 264, and/or 266, where the $1^{st}$ helical conductive pattern 260 and/or 264 is on the first surface 252 and the $2^{nd}$ helical conductive pattern 262 and/or 266 is on the second surface 254. Note that the planer helical antennas 256, 258, 280, and 282 may be implemented as described in co-pending patent application entitled PLANER HELICAL ANTENNA, having a filing date of Mar. 21, 2006, and a Ser. No. 11/386,247.

The ground pattern 268 on the second surface 254 provides a ground connection for the planer helical antennas 256, 258, 280, and 282. As shown in FIG. 21, the ground pattern 268 is approximately centered at an intersection of the axial orientations 270, 272, 284, and 286 and the second planer helical antennas 256, 258, 280, and 282 are off-center of the intersection. Note that the geometric shape of the ground pattern 268 may be a circle, an oval, a square, a rectangle, and/or a combination thereof to provide an effective ground plane for the antenna structure.

FIGS. 22 and 23 respectively are top and bottom diagrams of another embodiment of an antenna structure, which includes four planer helical antennas 256, 258, 280, and 282 positioned along respective axial orientations 270, 272, 284, and 286 on the supporting substrate 250 as previously discussed with reference to FIGS. 20 and 21. In this embodiment, the ground pattern 268 further includes radial walls 290 on the first and/or second surfaces 252 and 254.

The radial walls 290 on the second surface 254 are electrically coupled to the first geometric shape (e.g., the circle as shown) of the ground pattern 268. As shown in FIG. 23, each of the radial walls 290 extends at least a length of the second helical conductive pattern 262 and/or 266 of the planer helical antennas 256, 258, 280, and 282 along a corresponding one of a plurality of axis that is between a pair of the first, second, third, and fourth axial orientations 270, 272, 284, and 286.

The radial walls 290 on the first surface 252, if included, have a corresponding image of the radial walls on the second surface 254. The corresponding image radial walls 290 are of the conductive material and are electrically coupled to the ground pattern 268.

FIGS. 24-26 respectively are top, side, and bottom diagrams of another embodiment of an antenna structure. In this embodiment, the planer antenna structure first and second planer antennas 300 and 302. The planer antenna structure may further include a ground pattern 304.

As shown, the first planer antenna 300 is along the first axial orientation 270 and includes a conductive antenna pattern on the first surface 252 of a supporting substrate 250. The second planer antenna is along the second axial orientation 272 and includes the conductive antenna pattern on the first surface 252 of the supporting substrate 250. The conductive antenna pattern may be one of a plurality of patterns including a meandering line, a coil, parallel lines, and/or a combination thereof.

The ground pattern 304, if included, is on the second surface 254 of the supporting substrate 250 to provide a ground connection for the first and second planer antennas 300 and 302. As shown, the ground pattern 304 is approximately centered at an intersection of the first and second axial orientations 270 and 272 and the first and second planer antennas 300 and 302 are off-center of the intersection of the first and second axial orientations 270 and 272. Note that the geometric shape of the ground pattern 304 may be a circle, an oval, a square, a rectangle, and/or a combination thereof to provide an effective ground plane for the antenna structure.

FIGS. 27 and 28 respectively are top and bottom diagrams of another embodiment of an antenna structure. In this embodiment, the antenna structure includes four planer helical antennas 300, 302, 306, and 308 positioned along respective axial orientations 270, 272, 284, and 286 on the supporting substrate 250. Note that the conductive antenna pattern of the antennas 300, 302, 306, and 308 may be one of a plurality of patterns including a meandering line, a coil, parallel lines, and/or a combination thereof.

In this embodiment, the ground pattern 304 further includes radial walls 310 on the first and/or second surfaces 252 and 254. The radial walls 310 on the second surface 254, if included, are electrically coupled to the first geometric shape (e.g., the circle as shown) of the ground pattern 304. As shown in FIG. 28, each of the radial walls 310 extends beyond the length of the antennas 300, 302, 306, and 308 along a corresponding one of a plurality of axis that is between a pair of the first, second, third, and fourth axial orientations 270, 272, 284, and 286.

The radial walls 310 on the first surface 252, if included, have a corresponding image of the radial walls on the second surface 254. The corresponding image radial walls 310 are of the conductive material and are electrically coupled to the ground pattern 304.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled". As one of ordinary skill in the art will further appreciate, the term "operably associated with", as may be used herein, includes direct and/or indirect coupling of separate components and/or one component being embedded within another component. As one of ordinary skill in the art will still further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The preceding discussion has presented numerous embodiments of an antennas structure, RF transmitter, and RF transceiver. As one of ordinary skill in the art will appreciate, other embodiments may be derived from the teachings of the present invention without deviating from the scope of the claims.

What is claimed is:

1. An antenna section for use in a radio frequency (RF) transceiver front-end, the antenna section comprising:
a first plurality of antennas for in accordance with a first directional circular polarization, the first plurality of antennas positioned in accordance with a corresponding one of a plurality of transmit axial orientations, wherein each of the first plurality of antennas has a conductive antenna pattern on a first surface of a supporting substrate, the first plurality of antennas includes a first antenna for transmitting first amplified outbound RF signals and a second antenna for transmitting second amplified outbound RF signals; and
a second plurality of antennas for receiving in accordance with a second directional circular polarization that is opposite to the first circular polarization, the second plurality of antennas positioned in accordance with a corresponding one of a plurality of receive axial orientations, wherein each of the second plurality of antennas has the conductive antenna pattern on the first surface of the supporting substrate, and wherein the plurality of transmit axial orientations is interleaved with the plurality of receive axial orientations.

2. The antenna section of claim 1 wherein the second plurality of antennas includes:
a third antenna for receiving inbound RF signals to produce first received RF signals; and
a fourth antenna for receiving the inbound RF signals to produce second received RF signals.

3. The antenna section of claim 2 wherein the second plurality of antennas further includes:
a fifth antenna for receiving the inbound RF signals to produce third received RF signals; and
a sixth antenna for receiving the inbound RF signals to produce fourth received RF signals.

4. The antenna section of claim 3 wherein the first plurality of antennas further includes:
a seventh antenna for transmitting third amplified outbound RF signals that are inverted from the first amplified outbound RF signals; and
an eighth antenna for transmitting fourth amplified outbound RF signals that are inverted from the second amplified outbound RF signals.

5. An antenna section for use in a radio frequency (RF) transceiver front-end, the antenna section comprising:
a first plurality of antennas for in accordance with a first directional circular polarization, the first plurality of antennas positioned in accordance with a corresponding one of a plurality of transmit axial orientations, wherein each of the first plurality of antennas has a conductive antenna pattern on a first surface of a supporting substrate, the first plurality of antennas including:
a first antenna for transmitting first amplified outbound RF signals;
a second antenna for transmitting second amplified outbound RF signals;
a third antenna for transmitting third amplified outbound RF signals that are inverted from the first amplified outbound RF signals; and
a fourth antenna for transmitting fourth amplified outbound RF signals that are inverted from the second amplified outbound RF signals.

6. The antenna section of claim 5 further comprising:
a second plurality of antennas for receiving in accordance with a second directional circular polarization that is opposite to the first circular polarization, the second plurality of antennas positioned in accordance with a corresponding one of a plurality of receive axial orientations, wherein each of the second plurality of antennas has the conductive antenna pattern on the first surface of the supporting substrate, and wherein the plurality of transmit axial orientations is interleaved with the plurality of receive axial orientations.

7. The antenna section of claim 6 wherein the second plurality of antennas includes:

a fifth antenna for receiving inbound RF signals to produce first received RF signals; and a sixth antenna for receiving the inbound RF signals to produce second received RF signals.

8. The antenna section of claim 7 wherein the second plurality of antennas further includes:

a seventh antenna for receiving the inbound RF signals to produce third received RF signals; and an eighth antenna for receiving the inbound RF signals to produce fourth received RF signals.

9. An antenna section for use in a radio frequency (RF) transceiver front-end, the antenna section comprising:

a first plurality of antennas for transmitting in accordance with a first directional circular polarization, the first plurality of antennas positioned in accordance with a corresponding one of a plurality of transmit axial orientations, wherein each of the first plurality of antennas has a first conductive antenna pattern on a first surface of a supporting substrate; and a second plurality of antennas for receiving In accordance with a second directional circular polarization that is opposite to the first circular polarization, the second plurality of antennas positioned in accordance with a corresponding one of a plurality of receive axial orientations, wherein each of the second plurality of antennas has a second conductive antenna pattern on the first surface of the supporting substrate, and wherein the plurality of transmit axial orientations is interleaved with the plurality of receive axial orientations.

10. The antenna section of claim 9 wherein the second plurality of antennas includes:

a first antenna for receiving inbound RF signals to produce first received RF signals.

11. The antenna section of claim 10 wherein the second plurality of antennas includes:

a second antenna for receiving the inbound RF signals to produce second received RF signals.

12. The antenna section of claim 11 wherein the second plurality of antennas further includes:

a third antenna for receiving the inbound RF signals to produce third received RF signals.

13. The antenna section of claim 12 wherein the second plurality of antennas further includes:

a fourth antenna for receiving the inbound RF signals to produce fourth received RF signals.

14. The antenna section of claim 13 wherein the first plurality of antennas includes:

a fifth antenna for transmitting first amplified outbound RF signals; and a sixth antenna for transmitting second amplified outbound RF signals that are inverted from the first amplified outbound RF signals.

15. The antenna section of claim 14 wherein the first plurality of antennas further includes:

an seventh antenna for transmitting third amplified outbound RF signals that are orthogonal to the first amplified outbound RF signals.

16. An antenna section for use in a radio frequency (RF) transceiver front-end, the antenna section comprising:

a first plurality of antennas for in accordance with a first directional circular polarization, the first plurality of antennas positioned in accordance with a corresponding one of a plurality of transmit orientations, wherein each of the first plurality of antennas has a conductive antenna pattern on a first surface of a supporting substrate, the first plurality of antennas includes a first antenna for transmitting first amplified outbound RF signals and a second antenna for transmitting second amplified outbound RF signals; and a second plurality of antennas for receiving in accordance with a second directional circular polarization that is opposite to the first circular polarization, the second plurality of antennas positioned in accordance with a corresponding one of a plurality of receive orientations, wherein each of the second plurality of antennas has the conductive antenna pattern on the supporting substrate, and wherein the plurality of transmit orientations is interleaved with the plurality of receive orientations.

17. The antenna section of claim 1 wherein the second plurality of antennas includes:

a third antenna for receiving inbound RF signals to produce first received RF signals; and a fourth antenna for receiving the inbound RF signals to produce second received RF signals.

18. The antenna section of claim 17 wherein the second plurality of antennas further includes:

a fifth antenna for receiving the inbound RF signals to produce third received RF signals; and a sixth antenna for receiving the inbound RF signals to produce fourth received RF signals.

19. The antenna section of claim 18 wherein the first plurality of antennas further includes:

a seventh antenna for transmitting third amplified outbound RF signals that are inverted from the first amplified outbound RF signals; and an eighth antenna for transmitting fourth amplified outbound RF signals that are inverted from the second amplified outbound RF signals.

20. The antenna section of claim 16 wherein RF transceiver front end operates in accordance with at least one of: a wireless local area network protocol, and a wireless telephony protocol.

* * * * *